United States Patent
Li et al.

(10) Patent No.: US 10,764,844 B2
(45) Date of Patent: Sep. 1, 2020

(54) TRANSMIT POWER DETERMINING METHOD, USER EQUIPMENT, AND BASE STATION

(71) Applicant: HUAWEI TECHNOLOGIES CO., LTD., Shenzhen, Guangdong (CN)

(72) Inventors: Chao Li, Beijing (CN); Xingwei Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/051,920

(22) Filed: Aug. 1, 2018

(65) Prior Publication Data

US 2018/0343626 A1 Nov. 29, 2018

Related U.S. Application Data

(63) Continuation of application No. PCT/CN2016/073165, filed on Feb. 2, 2016.

(51) Int. Cl.
*H04W 52/54* (2009.01)
*H04W 52/38* (2009.01)
(Continued)

(52) U.S. Cl.
CPC .............. *H04W 52/54* (2013.01); *H04W 4/46* (2018.02); *H04W 52/286* (2013.01);
(Continued)

(58) Field of Classification Search
CPC . H04W 52/383; H04W 4/70; H04W 52/0209; H04W 52/346; H04W 52/367;
(Continued)

(56) References Cited

U.S. PATENT DOCUMENTS

2013/0272232 A1* 10/2013 Dinan ................. H04W 52/386
370/329
2013/0324182 A1 12/2013 Deng et al.
(Continued)

FOREIGN PATENT DOCUMENTS

CN 103067140 A 4/2013
CN 103596258 A 2/2014
(Continued)

OTHER PUBLICATIONS

Office Action issued in Chinese Application No. 201680054655.4 dated Sep. 4, 2019, 15 pages (With English Translation).
(Continued)

*Primary Examiner* — Shaima Q Aminzay
(74) *Attorney, Agent, or Firm* — Fish & Richardson P.C.

(57) ABSTRACT

The present disclosure relates to a method for determining a first-link transmit power. In one example method, a user equipment (UE) obtains transmit power indication information of a first link. The UE determines a first transmit power of control information and a second transmit power of data based on the transmit power indication information. The UE sends the control information at the first transmit power, and the data at the second transmit power. The control information and the data are sent on the first link in a same subframe.

14 Claims, 11 Drawing Sheets

(51) Int. Cl.
*H04W 52/32* (2009.01)
*H04W 52/28* (2009.01)
*H04W 52/34* (2009.01)
*H04W 4/46* (2018.01)
*H04W 72/04* (2009.01)
*H04W 52/24* (2009.01)
*H04W 52/08* (2009.01)
*H04W 52/36* (2009.01)
*H04W 52/10* (2009.01)

(52) U.S. Cl.
CPC ....... *H04W 52/325* (2013.01); *H04W 52/346* (2013.01); *H04W 52/383* (2013.01); *H04W 72/0406* (2013.01); *H04W 72/0473* (2013.01); *H04W 52/08* (2013.01); *H04W 52/10* (2013.01); *H04W 52/242* (2013.01); *H04W 52/367* (2013.01)

(58) Field of Classification Search
CPC ..... H04W 52/00; H04W 52/16; H04W 52/34; H04W 88/04; H04W 52/54; H04W 72/0473; H04W 72/0406; H04W 4/46; H04W 52/325; H04W 52/242; H04W 52/10; H04W 52/08; H04W 52/286; H04W 52/143; H04W 52/146; H04W 52/247; H04W 52/30
USPC ........................................................ 455/522
See application file for complete search history.

(56) References Cited

U.S. PATENT DOCUMENTS

2015/0094112 A1  4/2015 Lampinen et al.
2015/0163751 A1  6/2015 Guo
2016/0353390 A1  12/2016 Zhang

FOREIGN PATENT DOCUMENTS

| CN | 104066205 A | 9/2014 |
| CN | 104244315 A | 12/2014 |
| EP | 2770658 A1 | 8/2014 |
| EP | 2950595 A1 | 12/2015 |
| EP | 3016426 A1 | 5/2016 |
| WO | 2016008138 A1 | 1/2016 |

OTHER PUBLICATIONS

Huawei et al: "Power control for V2V", 3GPP Draft;R1-156429, Nov. 15, 2015, XP051002895, 4 pages.
Extended European Search Report issued in European Application No. 16888650.5 dated Nov. 16, 2018, 10 pages.
International Search Report issued in International Application No. PCT/CN2016/073165 dated Sep. 11, 2016, 14 pages.
3GPP TS 36.213 V13.0.1 (Jan. 2016), "3rd Generation Partnership Project; Technical Specification Group Radio Access Network; Evolved Universal Terrestrial Radio Access (E-UTRA); Physical layer procedures (Release 13)," Chapter 5.1.1.1, Jan. 2016, 14 pages.
3GPP TS 36.331 V13.0.0 (Dec. 2015), "3rd Generation Partnership Project; Technical Specification Group Radio Access Network; Evolved Universal Terrestrial Radio Access (E-UTRA); Radio Resource Control (RRC); Protocol specification (Release 13)," Chapter 6.3.8, Dec. 2015, 18 pages.
3GPP TS 36.101 V13.2.1 (Jan. 2016), 3rd Generation Partnership Project; Technical Specification Group Radio Access Network; Evolved Universal Terrestrial Radio Access (E-UTRA); User Equipment (UE) radio transmission and reception (Release 13), Chapter 6.5.2D, Jan. 2016, 21 pages.

* cited by examiner

TRANSMIT POWER DETERMINING METHOD, USER EQUIPMENT, AND BASE STATION

CROSS-REFERENCE TO RELATED APPLICATIONS

This application is a continuation of International Application No. PCT/CN 2016/073165, filed on Feb. 2, 2016, the disclosure of which is hereby incorporated by reference in its entirety.

TECHNICAL FIELD

Embodiments of the present invention relate to the communications field, and more specifically, to a transmit power determining method, user equipment, and a base station.

BACKGROUND

In recent years, with development of intelligent technologies, technologies such as intelligent transportation and unmanned driving have gained increasing attention. A key to propelling development of the foregoing industries lies in technologies and standards of Internet of Vehicles. In an Internet of Vehicles technology, vehicle to everything (V2X) communication includes vehicle to vehicle (V2V) communication, vehicle to infrastructure (V2I) communication, vehicle to pedestrian (V2P) communication, pedestrian to vehicle (P2V) communication, and the like. An essential problem of V2X communication is how to implement efficient communication between a vehicle and various devices in various complex environments, especially how to improve communication reliability and reduce a communication delay.

The 3rd Generation Partnership Project (3GPP) proposes that research on the Internet of Vehicles be performed according to an existing device to device (D2D) protocol. However, in the existing D2D protocol, control information and data information for V2X communication are based on time division multiplexing. This causes an additional delay. During research of V2X communication, it is proposed that control information and data information be configured in a same subframe to reduce a delay. However, this brings about a new problem, that is, how to allocate transmit powers between a control channel and a data channel in V2X communication.

SUMMARY

Embodiments of the present invention provide a transmit power determining method, to effectively allocate transmit powers for control information and data.

According to a first aspect, a transmit power determining method is provided, including:

obtaining, by UE, transmit power indication information of a first link;

determining, by the UE, a first transmit power of control information and a second transmit power of data based on the transmit power indication information; and sending, by the UE, the control information on the first link at the first transmit power, and sending the data on the first link at the second transmit power, where the control information and the data are in a same subframe.

The transmit power indication information includes first indication information of a first maximum transmit power of the UE.

When the control information and the data are in a same subframe, the first transmit power of the control information and the second transmit power of the data can be determined based on the foregoing embodiment of the present invention. This can resolve a prior-art problem that UE does not know how to properly determine transmit powers of control information and data.

Optionally, the first indication information includes one piece of control information instructing to use maximum transmit powers for both the control information and the data, or the first indication information includes two independent pieces of control information respectively instructing to use maximum transmit powers for the control information and the data.

Optionally, the control information and the data are carried in a same physical channel, or the control information is carried in a control channel of the first link, and the data is carried in a data channel of the first link.

In an example, the determining a first transmit power of control information and a second transmit power of data based on the transmit power indication information includes: determining the first transmit power and the second transmit power, so that a sum of a linear value of the first transmit power and a linear value of the second transmit power is equal to the first maximum transmit power, and a ratio of the first transmit power to the second transmit power is equal to a first preset value.

In another example, the determining a first transmit power of control information and a second transmit power of data based on the transmit power indication information includes: determining the first transmit power and the second transmit power, so that a sum of a linear value of the first transmit power and a linear value of the second transmit power is equal to the first maximum transmit power, and a difference between the first transmit power and the second transmit power is equal to a second preset value.

In another example, the determining a first transmit power of control information and a second transmit power of data based on the transmit power indication information includes: determining the first transmit power and the second transmit power, so that a sum of a linear value of the first transmit power and a linear value of the second transmit power is equal to the first maximum transmit power, and a difference between a transmit power on each PRB of the control information and a transmit power on each PRB of the data is equal to a third preset value.

In another example, the determining a first transmit power of control information and a second transmit power of data based on the transmit power indication information includes: determining a first power of the control information and a second power of the data based on transmission bandwidth of the first link and a path loss value of a second link between the UE and a serving base station of the UE; and determining the first transmit power and the second transmit power based on the first power, the second power, and the first maximum transmit power.

Specifically, if a sum of a linear value of the first power and a linear value of the second power is equal to the first maximum transmit power, it is determined that the first transmit power is equal to the first power and that the second transmit power is equal to the second power.

Specifically, if a sum of a linear value of the first power and a linear value of the second power is greater than the first maximum transmit power, it is determined that the first transmit power is equal to the first power or equal to a smaller one of the first power and the first maximum transmit power and that the second transmit power is equal to a difference between the linear value of the first maximum transmit power and a linear value of the first transmit power.

Specifically, if a sum of a linear value of the first power and a linear value of the second power is less than the first maximum transmit power, it is determined that the first transmit power is equal to a sum of the first power and a first value and that the second transmit power is equal to a sum of the second power and a second value, where a sum of a linear value of the first transmit power and a linear value of the second transmit power is equal to the first maximum transmit power, and the first value and the second value meet a predefined relationship.

In another example, the transmit power indication information further includes second indication information of a second maximum transmit power of the control information. The determining a first transmit power of control information and a second transmit power of data based on the transmit power indication information includes: using the second maximum transmit power as the first transmit power; and determining that the second transmit power is a difference between a linear value of the first maximum transmit power and a linear value of the first transmit power. Alternatively, the determining a first transmit power of control information and a second transmit power of data based on the transmit power indication information includes: determining a first power of the control information based on transmission bandwidth of the first link and a path loss value of a second link between the UE and a serving base station of the UE; using a smaller one of the first power and the second maximum transmit power as the first transmit power; and determining that the second transmit power is a difference between a linear value of the first maximum transmit power and a linear value of the first transmit power.

In another example, the transmit power indication information further includes second indication information of a second maximum transmit power of the control information, and the transmit power indication information further includes third indication information of a third maximum transmit power of the data. The determining a first transmit power of control information and a second transmit power of data based on the transmit power indication information includes: determining a second power of the data based on transmission bandwidth of the first link and a path loss value of a second link between the UE and a serving base station of the UE; using the second maximum transmit power as the first transmit power, or using a smaller one of a first power and the second maximum transmit power as the first transmit power, where the first power is of the control information and is determined based on the transmission bandwidth and the path loss value; and using a smallest one of the second power, the third maximum transmit power, and a difference between a linear value of the first maximum transmit power and a linear value of the first transmit power as the second transmit power. Alternatively, the determining a first transmit power of control information and a second transmit power of data based on the transmit power indication information includes: determining a first power of the control information based on transmission bandwidth of the first link and a path loss value of a second link between the UE and a serving base station of the UE; using the third maximum transmit power as the second transmit power, or using a smaller one of a second power of the data and the third maximum transmit power as the second transmit power, where the second power is determined based on the transmission bandwidth and the path loss value; and using a smallest one of the first power, the second maximum transmit power, and a difference between a linear value of the first maximum transmit power and a linear value of the second transmit power as the first transmit power.

Optionally, the method further includes: transmitting the control information and/or the data a plurality of times, where in at least one of the plurality of transmissions, the control information and the data are in a same subframe, where a quantity of the plurality of transmissions of the control information is or is not equal to a quantity of the plurality of transmissions of the data.

Optionally, transmission of the control information includes a first part transmission of the control information and a second part transmission of the control information, transmission of the data includes a first part transmission of the data and a second part transmission of the data, the first part transmission of the control information and the first part transmission of the data are performed in a same subframe, and the second part transmission of the control information and the second part transmission of the data are performed in different subframes; and the sending the control information on the first link at the first transmit power, and sending the data on the first link at the second transmit power includes: performing the first part transmission of the control information on the first link at the first transmit power, and performing the first part transmission of the data on the first link at the second transmit power; and performing the second part transmission of the control information on the first link at a third transmit power, and performing the second part transmission of the data on the first link at a fourth transmit power, where neither of the third transmit power nor the fourth transmit power is greater than the first maximum transmit power.

In this way, when the control information and the data are in a same subframe, potential impact brought about by half duplexing can be reduced; when the control information and the data are in different subframes, different transmit powers can be configured, so that better coverage is provided. It can be learned that, both detectability of a received signal and a coverage area are considered in the embodiments.

According to a second aspect, user equipment is provided, including:

an obtaining unit, configured to obtain transmit power indication information of a first link;

a determining unit, configured to determine a first transmit power of control information and a second transmit power of data based on the transmit power indication information obtained by the obtaining unit; and a sending unit, configured to: send the control information on the first link at the first transmit power determined by the determining unit, and send the data on the first link at the second transmit power determined by the determining unit, where the control information and the data are in a same subframe.

The user equipment in the second aspect can implement the transmit power determining method performed by the UE in the method in the first aspect.

According to a third aspect, user equipment is provided, including:

a receiver, configured to obtain transmit power indication information of a first link;

a processor, configured to determine a first transmit power of control information and a second transmit power of data based on the transmit power indication information obtained by the receiver; and a transmitter, configured to: send the control information on the first link at the first transmit power determined by the processor, and send the data on the first link at the second transmit power determined by the processor, where the control information and the data are in a same subframe.

The user equipment in the third aspect can implement the transmit power determining method performed by the UE in the method in the first aspect.

According to a fourth aspect, a computer readable storage medium is provided, where a program is stored in the computer readable storage medium, and the program enables user equipment to perform the transmit power determining method according to any one of the first aspect and the implementations of the first aspect.

According to a fifth aspect, a method for determining a first-link transmit power is provided, including:

receiving, by first user equipment UE, first indication information, where the first indication information includes indication information of a first maximum transmit power of second UE; and determining, by the first UE, the first-link transmit power based on the first indication information, where the first link is a link between the first UE and the second UE.

Herein, the receiving, by first UE, first indication information includes: receiving, by the first UE, the first indication information from the second UE or a base station.

In an embodiment of the present invention, the first UE may determine the first-link transmit power based on the first indication information. This can prevent communication on a cellular link of the base station from being interfered with by data transmission between UEs on the first link, and also can ensure efficiency of communication on the first link and communication on a second link.

In an example, the determining, by the first UE, the first-link transmit power based on the first indication information includes: using a smaller one of a second maximum transmit power of the first UE and the first maximum transmit power as the first-link transmit power.

In another example, the determining, by the first UE, the first-link transmit power based on the first indication information includes: determining a first power based on transmission bandwidth of the first link and a path loss value of the first link; and using a smaller one of the first maximum transmit power and the first power as the first-link transmit power; or using a smallest one of a second maximum transmit power of the first UE, the first maximum transmit power, and the first power as the first-link transmit power.

Optionally, before the determining the first-link transmit power, the method further includes: receiving indication information used to indicate an identity ID of a sequence used by the first UE, where the ID of the sequence used by the first UE has a same value as that of an ID of a sequence used by one or more other UEs that communicate with the second UE, or the ID of the sequence used by the first UE has a value different from that of an ID of a sequence used by one or more other UEs that communicate with the second UE, and the ID of the sequence used by the first UE is a value associated with the second UE.

In an example, the determining, by the first UE, the first-link transmit power based on the first indication information includes: using a smaller one of a maximum transmit power of the first UE and the first maximum transmit power as a first transmit power; sending the sequence at the first transmit power; receiving adjustment indication information sent by the base station, where the adjustment indication information is generated by the base station based on the sequence; and adjusting the first transmit power based on the adjustment indication information to determine the first-link transmit power.

The sending the sequence includes: sending the sequence on a second link between the first UE and the base station; or sending the sequence on the first link.

Optionally, before the determining the first-link transmit power, the method further includes: receiving, by the first UE, second indication information sent by the second UE or the base station, where the second indication information includes indication information of a third maximum transmit power of the first UE.

In an example, the determining the first-link transmit power includes: using a smallest one of a second maximum transmit power of the first UE, the first maximum transmit power, and the third maximum transmit power as the first-link transmit power; using a smaller one of a second maximum transmit power of the first UE and the third maximum transmit power as the first-link transmit power; or using a smaller one of the first maximum transmit power and the third maximum transmit power as the first-link transmit power.

According to a sixth aspect, a method for determining a first-link transmit power is provided, including:

performing, by a base station, signal detection to determine a first power of a sequence received from at least one first user equipment UE;

determining, by the base station based on the first power, power adjustment information corresponding to the first UE; and sending, by the base station, the power adjustment information to the first UE, so that the first UE determines a first-link transmit power, where the first link is a link between the first UE and second UE.

An ID of a sequence used by the first UE has a same value as that of an ID of a sequence used by one or more other UEs that communicate with the second UE, or an ID of a sequence used by the first UE has a value different from that of an ID of a sequence used by one or more other UEs that communicate with the second UE, and the ID of the sequence used by the first UE is a value associated with the second UE.

Optionally, the determining, based on the first power, power adjustment information corresponding to the first UE includes: determining a value relationship between the first power and a specific threshold of the base station, and determining the power adjustment information based on the value relationship.

According to a seventh aspect, user equipment is provided, where the user equipment is first UE and includes:

a receiving unit, configured to receive first indication information, where the first indication information includes indication information of a first maximum transmit power of second UE; and a determining unit, configured to determine the first-link transmit power based on the first indication information received by the receiving unit, where the first link is a link between the first UE and the second UE.

The user equipment in the seventh aspect can implement the method for determining a first-link transmit power performed by the first UE in the method in the fifth aspect.

According to an eighth aspect, user equipment is provided, including:

a receiver, configured to receive first indication information, where the first indication information includes indication information of a first maximum transmit power of second UE; and a processor, configured to determine the first-link transmit power based on the first indication information received by the receiver, where the first link is a link between the first UE and the second UE.

The user equipment in the eighth aspect can implement the method for determining a first-link transmit power performed by the first UE in the method in the fifth aspect.

According to a ninth aspect, a computer readable storage medium is provided, where a program is stored in the computer readable storage medium, and the program enables user equipment to perform the method for determining a first-link transmit power according to any one of the fifth aspect and the implementations of the fifth aspect.

According to a tenth aspect, a base station is provided, including:

a determining unit, configured to perform signal detection to determine a first power of a sequence received from at least one first user equipment UE;

a receiving unit, configured to receive the sequence, where the determining unit is further configured to determine, based on the first power, power adjustment information corresponding to the first UE; and a sending unit, configured to send, to the first UE, the power adjustment information determined by the determining unit, so that the first UE determines a first-link transmit power, where the first link is a link between the first UE and second UE.

The base station in the tenth aspect can implement the method for determining a first-link transmit power performed by the base station in the method in the sixth aspect.

According to an eleventh aspect, a base station is provided, including:

a processor, configured to perform signal detection to determine a first power of a sequence received from at least one first user equipment UE;

a receiver, configured to receive the sequence, where the processor is further configured to determine, based on the first power, power adjustment information corresponding to the first UE; and a transmitter, configured to send, to the first UE, the power adjustment information determined by the processor, so that the first UE determines a first-link transmit power, where the first link is a link between the first UE and second UE.

The base station in the eleventh aspect can implement the method for determining a first-link transmit power performed by the base station in the method in the sixth aspect.

According to a twelfth aspect, a computer readable storage medium is provided, where a program is stored in the computer readable storage medium, and the program enables a base station to perform the method for determining a first-link transmit power according to either the sixth aspect and the implementation of the sixth aspect.

BRIEF DESCRIPTION OF DRAWINGS

To describe the technical solutions in the embodiments of the present invention more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly and completely describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Figure 1:
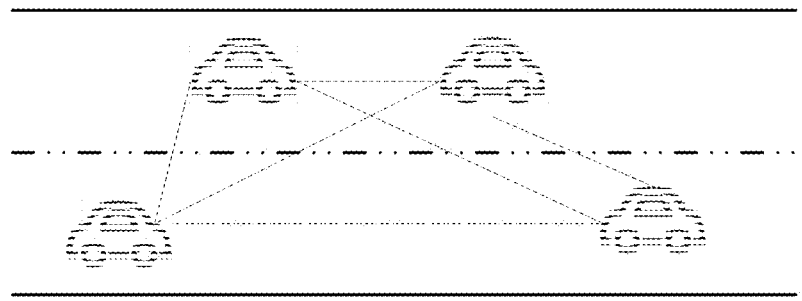
FIG. 1 is a schematic diagram of a V2V communication scenario in an embodiment of the present invention.

FIG. 1 is a schematic diagram of a V2V communication scenario in an embodiment of the present invention. FIG. 1 shows a schematic diagram of a scenario in which four vehicles communicate with each other on lanes.

During V2V communication, assisted driving and autonomous driving can be implemented through wireless communication among a plurality of on-board units (OBU), thereby effectively increasing traffic efficiency, avoiding a traffic accident, and reducing a driving risk.

Figure 2:
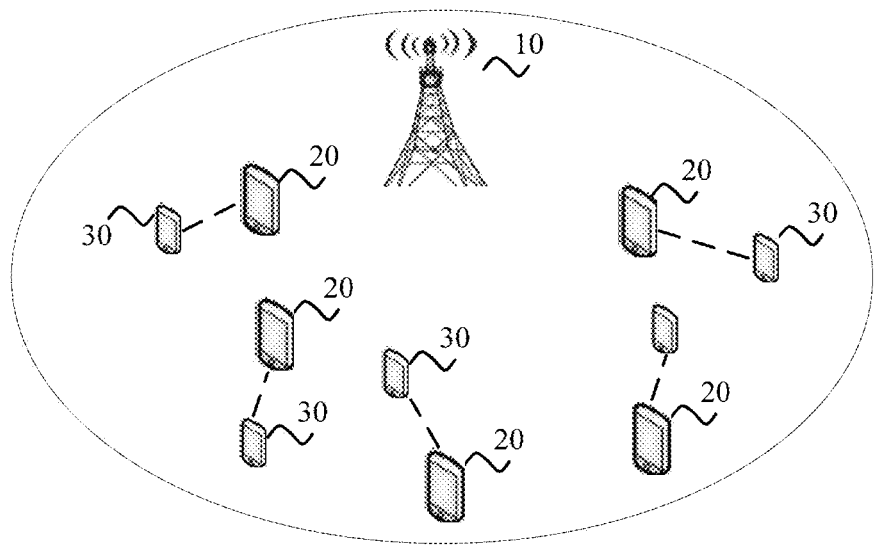
FIG. 2 is a schematic diagram of an application scenario in an embodiment of the present invention.
Figure 3:
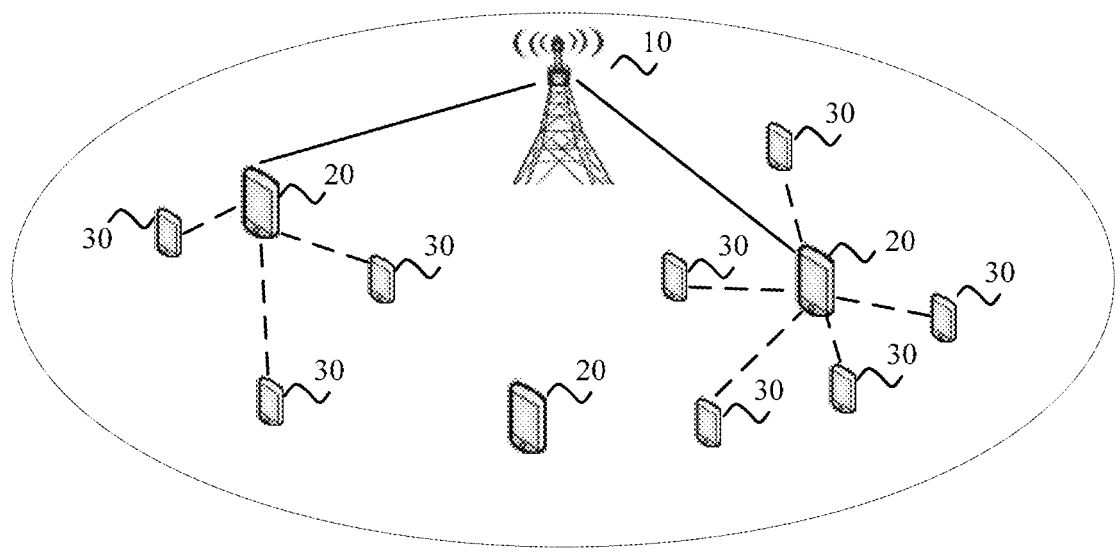
FIG. 3 is another schematic diagram of an application scenario in an embodiment of the present invention.

FIG. 2 and FIG. 3 are schematic diagrams of application scenarios in an embodiment of the present invention. In FIG. 2 and FIG. 3, UE 20 can directly communicate with a base station 10, and the UE 20 may be referred to as relay UE. UE 30 cannot necessarily directly communicate with the base station 10, but the UE 30 can communicate with the UE 20. Therefore, the UE 30 can implement communication with the base station 10 by using the UE 20. The UE 30 may be referred to as remote UE.

In FIG. 2, a communication distance between the UE 20 and the UE 30 with which the UE 20 can communicate is relatively short, for example, approximately 10 meters (m). In FIG. 3, a communication distance between the UE 20 and the UE 30 with which the UE 20 can communicate is relatively long, for example, approximately 100 m to 1000 m.

Figure 4:
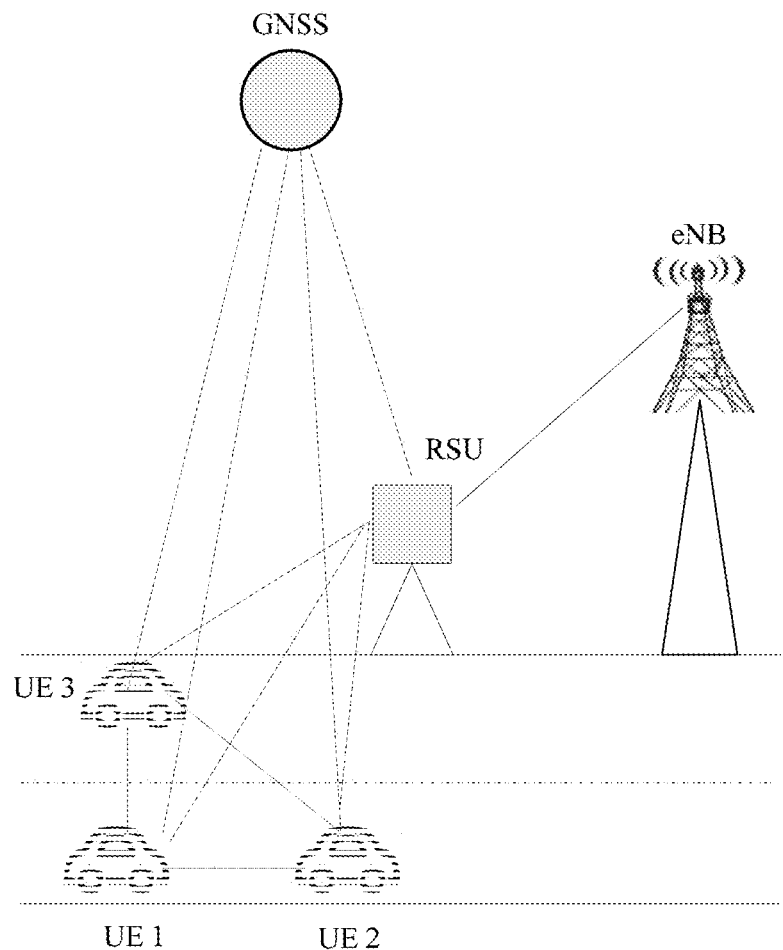
FIG. 4 is another schematic diagram of an application scenario in an embodiment of the present invention.

Based on the example scenarios in FIG. 2 and FIG. 3, FIG. 4 shows a schematic diagram of an actual application scenario in an embodiment of the present invention. An evolved NodeB (eNB) in FIG. 4 is equivalent to the base station 10 in FIG. 2 and FIG. 3. A roadside unit (RSU), and UE 1, UE 2, and UE 3 in FIG. 4 may respectively be the UE 20 and the UEs 30 in FIG. 2 and FIG. 3. For example, the RSU is the UE 20, and can directly communicate with the eNB; the UE 1, the UE 2, and the UE 3 are the UEs 30, and can communicate with the eNB by using the RSU. In addition, FIG. 4 further shows a global navigation satellite system (GNSS) that may be configured to provide location information and the like for another network element.

In terms of functions, the RSU may be an on-board device or an eNB. The UE 1, the UE 2, and the UE 3 may be on-board devices, and the on-board devices may perform V2V communication with each other by using a sidelink. The on-board device moves at a high speed with vehicles. For example, when the UE 1 and the UE 2 move relatively, a relative movement speed is highest.

During communication with each other, the devices shown in FIG. 4 may use a spectrum used for a cellular link, or may use an intelligent transportation spectrum near 5.9 GHz. Technologies used by the devices to communicate with each other may be enhanced based on an LTE protocol or a D2D technology.

In the embodiments of the present invention, the sidelink may be a communications link between UEs, and is referred to as a D2D link in D2D communication and is referred to as a PC5 link in a particular scenario. In Internet of vehicles, the sidelink is also referred to as a V2V link, a vehicle to infrastructure (V2I) link, or a vehicle to pedestrian (V2P) link, or the like. The sidelink may be used to send information in any of the following modes: a broadcast mode, a unicast mode, or a multicast mode. A spectrum used for a cellular link, such as an uplink spectrum used for a cellular link, may be used for the sidelink.

In the embodiments of the present invention, the UE may also be referred to as a terminal, and may include an OBU of a vehicle, an RSU or the like on a road side, or a mobile phone or the like used by a pedestrian.

Figures 5A, 5B:
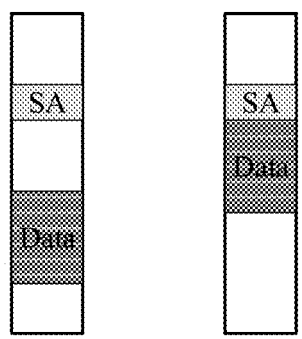
FIG. 5(a) and FIG. 5(b) are schematic diagrams of scenarios in which SA and data are in a same subframe in an embodiment of the present invention.

In V2V communication, it is proposed that control information (such as scheduling assignment (SA)) and data be configured in a same subframe, as shown in FIG. 5. In FIG. 5(a), SA and data are not adjacent in frequency domain in a same subframe; in FIG. 5(b), SA and data are adjacent in frequency domain in a same subframe. In other words, locations of the SA and the data may be adjacent or not adjacent in frequency domain. In addition, the SA may be carried in an independent physical channel, such as a physical sidelink control channel (PSCCH), or the SA and the data may be carried in a same physical channel, such as a physical sidelink shared channel (PSSCH).

In a D2D protocol in Rel-12, SA is also referred to as a PSCCH channel, and is a channel used to transmit control information between UEs. The control information is used to indicate, to a receiver, parameter information used to transmit a data portion, such as a time-frequency resource location, a resource size, and a modulation and coding scheme (MCS) value. In the D2D in Rel-12, SA and data are in different subframes. Therefore, transmit powers of the SA and the data may be independently configured in each subframe.

It should be noted that, though in a current LTE system, duration of one subframe is usually one millisecond (ms), in the embodiments of the present invention, duration of one subframe is not limited. Specifically, in the embodiments of the present invention, duration of one subframe may be basic duration for one transmission, or may be preset duration. For example, the duration of one subframe may be 1 ms, may be greater than 1 ms, for example, 2 ms or 10 ms, or may be less than 1 ms, for example, 0.625 ms, 0.125 ms, or 0.2 ms.

Parallel transmission of SA and data is based on a multi-carrier system. Therefore, for a transmitter, a total available transmit power is fixed in one subframe, for example, does not exceed a maximum transmit power of UE. In a scenario in which SA and data are in one subframe, when a base station instructs user equipment (UE) to use a maximum transmit power, if the SA is sent at the maximum transmit power, there is no transmit power available to the data, and vice versa.

A problem to be resolved in the embodiments of the present invention is how to determine a transmit power when UE performs transmission on a sidelink, and especially how to determine transmit powers of control information and data when a maximum transmit power is configured.

Some terms used in the present invention are first described briefly below.

First maximum transmit power: is marked as $P_{CMAX,c}$, $P_{CMAX}$, $P_{EMAX}$, or $P_{EMAX,c}$, and has any of the following meanings:

a maximum transmit power or an available maximum transmit power on a UE side;

a maximum transmit power or an available maximum transmit power on all carriers in a current subframe; or a maximum transmit power or an available maximum transmit power on a current carrier in a current subframe.

Alternatively, the first maximum transmit power may be a maximum transmit power configured or predefined by a base station and indicated by maximum transmit power indication information.

It should be noted that, a value of the first maximum transmit power herein may be a logarithmic value (whose unit may be dBm) or a linear value (whose unit may be mW), that is, may be a value corresponding to a single frequency-domain transmission resource (such as one PRB) or may be a value corresponding to entire transmission bandwidth. Similarly, whether a power mentioned in subsequent embodiments of the present invention is of a logarithmic value or a linear value may be determined based on a unit of the power.

First link: indicates a communications link between UEs, and may be a D2D link, a V2X link, a sidelink, or the like. For example, the first link may be a link between the UE 20 and the UE 30 in FIG. 2 or FIG. 3, or may be a link between the RSU and the UE 3 in FIG. 4. Communication on the first link may be based on any one of a unicast mode, a multicast mode, and a broadcast mode.

Second link: indicates a communications link between UE and a base station, and may be a cellular link. For example, the second link may be a link between the UE 20/UE 30 and the base station 10 in FIG. 2 or FIG. 3, or may be a link between the RSU and the eNB in FIG. 4.

Relay UE, is UE that can directly communicate with a base station and can relay data from another UE to the base station. For example, the relay UE may be the UE 20 in FIG. 2 or FIG. 3, or may be the RSU in FIG. 4.

Remote UE: is remote UE, and indicates UE that cannot necessarily directly communicate with a base station but can communicate with the base station by using relay UE. For example, the remote UE may be the UE 30 in FIG. 2 or FIG. 3, or may be the UE 1, the UE 2, or the UE 3 in FIG. 4.

Figure 6:
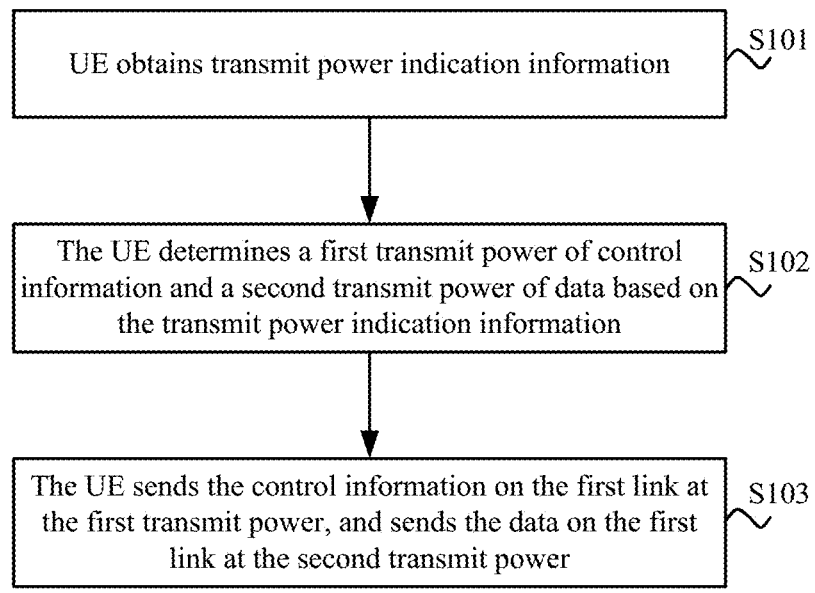
FIG. 6 is a flowchart of a transmit power determining method in an embodiment of the present invention.

FIG. 6 is a flowchart of a transmit power determining method in an embodiment of the present invention. This method is used to determine a first-link transmit power.

Figures 7A, 7B:
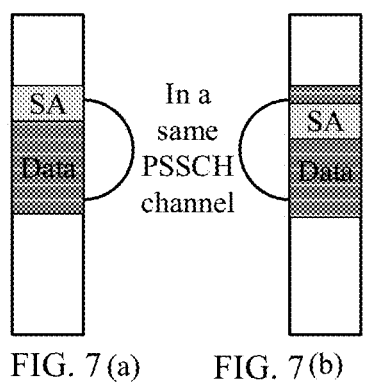
FIG. 7(a) and FIG. 7(b) are schematic diagrams of scenarios in which SA and data are in a same physical channel in an embodiment of the present invention.

Control information and data that are sent by UE may be in a same subframe. The control information and the data may be carried in different physical channels, the control channel is carried in a control channel (such as a PSCCH) of a first link, and the data is carried in a data channel (such as a PSSCH) of the first link. Alternatively, the control information and the data may be carried in a same physical channel. For example, both the control information and the data are carried in a data channel (such as a PSSCH) of a first link. As shown in FIG. 7(*a*) and FIG. 7(*b*), FIG. 7(*a*) and FIG. 7(*b*) are schematic diagrams of scenarios in which both control information (which is SA in FIG. 7) and data are carried in a PSSCH.

The method shown in FIG. 6 includes the following steps.

S101. UE obtains transmit power indication information.

Specifically, the UE may obtain the transmit power indication information from a serving base station of the UE. For example, the UE may receive, on a second link, the transmit power indication information sent by the serving base station.

The UE may be the UE 20 in FIG. 2 or FIG. 3, the UE may be the RSU in FIG. 4, the UE may be the UE 2, in FIG. 4, that can communicate with the eNB, and so on. This is not limited in the present invention.

Specifically, in S101, the UE obtains the transmit power indication information of a first link.

In this embodiment of the present invention, the transmit power indication information may include first indication information of a first maximum transmit power of the UE.

Optionally, in an embodiment, the transmit power indication information may include one piece of control information instructing to use maximum transmit powers for both the control information and the data. For example, the transmit power indication information is a 1-bit transmitter power control (TPC) command. In S101, the 1-bit TPC command "1" may be used to indicate that the maximum transmit powers are to be used for both the control information and the data of the UE, or the 1-bit TPC command "0" may be used to indicate that the maximum transmit powers are to be used for both the control information and the data of the UE. This is not limited in the present invention.

Optionally, in another embodiment, the transmit power indication information may include two independent pieces of control information respectively instructing to use maximum transmit powers for the control information and the data. For example, the transmit power indication information is a 2-bit TPC command. In S101, if the 2-bit TPC command is "11", it indicates that the maximum transmit powers are to be used for both the control information and the data of the UE. If the 2-bit TPC command is "10", it indicates that a maximum transmit power is to be used for the control information of the UE, and a maximum transmit power may not be used for the data of the UE. If the 2-bit TPC command of two bits is "01", it indicates that a maximum transmit power is to be used for the data of the UE, and a maximum transmit power may not be used for the control information of the UE.

Optionally, two independent fields may respectively indicate that a maximum transmit power is to be used for the control information and that a maximum transmit power is to be used for the data. For example, one bit is used to indicate whether a maximum transmit power is to be used for the control information, and another bit is used to indicate whether a maximum transmit power is to be used for the data.

Optionally, in another embodiment, at least one of indication information of maximum transmit powers may be indicated by using implicit information, for example, a status defined in an MCS field or a reserved bit in a time-domain or frequency-domain resource indication field.

Optionally, in an embodiment, before S101, the serving base station may indicate a maximum transmit power (referred to as a second maximum transmit power) available to the control information of the UE, and/or indicate a maximum transmit power (referred to as a third maximum transmit power) available to the data of the UE.

In an example, the second maximum transmit power is less than the first maximum transmit power, and the third maximum transmit power is less than the first maximum transmit power. Herein, the second maximum transmit power may be marked as $P_{v1}$, and the third maximum transmit power may be marked as $P_{v2}$.

In this case, if the 2-bit TPC command is "11" or "10", it may be considered that the transmit power indication information includes second indication information of the second maximum transmit power of the control information. If the 2-bit TPC command is "11" or "01", it may be considered that the transmit power indication information includes third indication information of the third maximum transmit power of the data. If the 2-bit TPC command is "11", it may be considered that the transmit power indication information includes both second indication information of the second maximum transmit power of the control information and third indication information of the third maximum transmit power of the data.

Optionally, before S101, the UE may obtain configuration information from the serving base station. The configuration information may be sent by the serving base station in a broadcast mode by using control signaling.

The configuration information may include a value of the second maximum transmit power and/or a value of the third maximum transmit power. In other words, the value of the second maximum transmit power and the value of the third maximum transmit power may be preconfigured by the serving base station of the UE.

In addition, in this embodiment of the present invention, the value of the second maximum transmit power and the value of the third maximum transmit power may be indicated by the base station by using signaling such as radio resource control (RRC) signaling or a system information block (SIB). Alternatively, the value of the second maximum transmit power and the value of the third maximum transmit power may be predefined by the UE. For example, when the UE is not located in network coverage or is in a communications mode of non-network control, the UE may obtain the foregoing information by using information predefined in the UE. Alternatively, the value of the second maximum transmit power and the value of the third maximum transmit power may be agreed upon in advance in a communications protocol.

S102. The UE determines a first transmit power of control information and a second transmit power of data based on the transmit power indication information.

When the transmit power indication information in S101 includes the first indication information of the first maximum transmit power of the UE:

optionally, in an embodiment, the first transmit power and the second transmit power may be determined, so that a sum of the first transmit power and the second transmit power is equal to the first maximum transmit power, and a ratio of the first transmit power to the second transmit power is equal to a first preset value.

The sum of the first transmit power and the second transmit power may be a sum of a linear value of the first transmit power and a linear value of the second transmit power. Correspondingly, that a sum of the first transmit power and the second transmit power is equal to the first maximum transmit power means that the sum of the linear value of the first transmit power and the linear value of the second transmit power is equal to a linear value of the first maximum transmit power.

The ratio of the first transmit power to the second transmit power may be a ratio of the linear value of the first transmit power to the linear value of the second transmit power.

Herein, the first preset value may be predefined, for example, may be preconfigured in the UE. Alternatively, the first preset value may be agreed upon in advance in a communications protocol.

It should be noted that, in this embodiment of the present invention, an operation such as summation or subtraction between powers means calculation based on linear values (for example, a unit corresponding to linear values is milliwatt (mW)) of the powers. Similarly, in subsequent embodiments of the present invention, an operation such as summation or subtraction between powers needs to be performed after the corresponding powers are converted into linear values thereof. If an operation such as summation or subtraction between powers may be an operation between logarithmic values of the powers, corresponding description may be provided in a corresponding part of this specification.

Assuming that a linear value of a power is x1 (mW), and a logarithmic value of the power is x2 (dBm), a relationship between the linear value and the logarithmic value is $10 \cdot \log_{10}(x1) = x2$.

For example, the first maximum transmit power may be allocated to the control information and the data based on the first preset value. If the first preset value is 1, the first maximum transmit power is equally allocated to the control information and the data.

For example, if the first preset value is 1 and the first maximum transmit power $P_{CMAX,c} = 23$ dBm (which is approximately 199.53 mW), it may be determined that the first transmit power of the control information is 20 dBm (99.765 mW) and that the second transmit power of the data is 20 dBm (99.765 mW).

Optionally, in another embodiment, the first transmit power and the second transmit power may be determined, so that a sum of the first transmit power and the second transmit power is equal to the first maximum transmit power, and a difference between the first transmit power and the second transmit power is equal to a second preset value.

The difference between the first transmit power and the second transmit power may be a difference between a linear value of the first transmit power and a linear value of the second transmit power, or a difference between a logarithmic value of the first transmit power and a logarithmic value of the second transmit power. Correspondingly, that a difference between the first transmit power and the second transmit power is equal to a second preset value means that a difference between the linear value of the first transmit power and the linear value of the second transmit power is equal to a linear value of the second preset value, or a difference between the logarithmic value of the first transmit power and the logarithmic value of the second transmit power is equal to a logarithmic value of the second preset value.

Herein, the second preset value may be predefined, for example, may be preconfigured in the UE. Alternatively, the second preset value may be agreed upon in advance in a communications protocol.

For example, if the second preset value is 10 mW and the first maximum transmit power $P_{CMAX,c} = 23$ dBm (which is approximately 199.53 mW), it may be determined that the first transmit power of the control information is 20.2 dBm (104.765 mW) and that the second transmit power of the data is 19.776 dBm (94.765 mW).

It can be understood that, if the second preset value is 10 dBm, the following should be met: The difference between the logarithmic value of the first transmit power and the logarithmic value of the second transmit power is equal to 10 dBm.

Optionally, in another embodiment, the first transmit power and the second transmit power may be determined, so that a sum of the first transmit power and the second transmit power is equal to the first maximum transmit power, and a difference between a transmit power on each physical resource block (PRB) of the control information and a transmit power on each PRB of the data is equal to a third preset value.

The difference between the transmit power on each PRB of the control information and the transmit power on each PRB of the data may be a difference between a linear value of the transmit power on each PRB of the control information and a linear value of the transmit power on each PRB of the data, or may be a difference between a logarithmic value of the transmit power on each PRB of the control information and a logarithmic value of the transmit power on each PRB of the data. Correspondingly, that a difference between a transmit power on each PRB of the control information and a transmit power on each PRB of the data is equal to a third preset value means that the difference between the linear value of the transmit power on each PRB of the control information and the linear value of the transmit power on each PRB of the data is equal to a linear value the third preset value, or the difference between the logarithmic value of the transmit power on each PRB of the control information and the logarithmic value of the transmit power on each PRB of the data is equal to a logarithmic value of the third preset value.

Herein, the third preset value may be predefined, for example, may be preconfigured in the UE. Alternatively, the first preset value may be agreed upon in advance in a communications protocol.

Herein, the third preset value may alternatively be determined by the UE. Optionally, the UE may calculate the third preset value based on modulation and coding scheme (MCS) values of the control information and the data. Alternatively, the UE may calculate the third preset value based on transmission bandwidth occupied by the control information and the data. Alternatively, the UE may calculate the third preset value based on MCS values of the control information and the data and transmission bandwidth occupied by the control information and the data.

For example, if the third preset value is 10 mW, the first maximum transmit power $P_{CMAX,c}$=23 dBm (which is approximately 199.53 mW), the control information occupies one PRB, and the data occupies 10 PRBs, it may be determined that the first transmit power of the control information is 14.35 dBm (27.23 mW) and that the second transmit power of the data is 22.36 dBm (172.3 mW).

It can be understood that, if the third preset value is 10 dBm, the following should be met: The difference between the logarithmic value of the transmit power on each PRB of the control information and the logarithmic value of the transmit power on each PRB of the data is equal to 10 dBm.

In the case in which the control information and the data are carried in a same channel in FIG. 7, the control information and the data may be arranged adjacently in frequency domain in a same subframe, or the control information may occupy, in a PSSCH channel in frequency domain, a bandwidth resource between discontiguous bandwidth resources occupied by the data. A size of frequency-domain resources occupied by the data may vary with a size of actually sent data packets, and therefore, this case is applicable to the foregoing embodiment in which the third preset value is used, and the first transmit power and the second transmit power are determined by using a predetermined difference between powers on each PRB.

Optionally, in another embodiment, the first transmit power and the second transmit power may be calculated with reference to an open loop power value that is calculated based on an open loop formula.

In an example, a first power of the control information and a second power of the data may be calculated based on transmission bandwidth of the first link and a path loss value of a second link between the UE and a serving base station, and the first transmit power and the second transmit power are calculated based on the first power, the second power, and the first maximum transmit power.

Specifically, the first power of the control information and the second power of the data may be calculated based on the transmission bandwidth of the first link and the path loss value of the second link.

Assuming that the control information is carried in a PSCCH channel, the data is carried in a PSSCH channel, the first power is marked as $P_{PSCCH\_O}$, and the second power is marked as $P_{PSSCH\_O}$, the first power and the second power may be calculated by using the following formula:

$$P_{PSCCH\_O}=10\log_{10}(M_{PSCCH})+P_{O\_PSCCH,1}+\alpha_{PSCCH,1} \cdot PL, \text{ and}$$

$$P_{PSSCH\_O}=10\log_{10}(M_{PSSCH})+P_{O\_PSSCH,1}+\alpha_{PSSCH,1} \cdot PL.$$

Herein, the calculated first power $P_{PSCCH\_O}$ and second power $P_{PSSCH\_O}$ may be logarithmic values of the powers.

$M_{PSCCH}$ represents transmission bandwidth of the PSCCH channel, $M_{PSSCH}$ represents transmission bandwidth of the PSSCH channel, PL represents the path loss value of the second link between the UE and the serving base station, and $\alpha_{PSCCH,1}$ and $\alpha_{PSSCH,1}$ are path loss compensation coefficients of the PSCCH channel and the PSSCH channel, respectively; and $P_{O\_PSCCH,1}$ and $P_{O\_PSSCH,1}$ are two power values configured or predefined by the serving base station.

PL may be notified, after being determined by the serving base station, to the UE by the serving base station by using signaling, or may be determined by the UE. For a method for calculating a path loss value, refer to the prior art. Details are not described herein.

$\alpha_{PSCCH,1}$, $\alpha_{PSSCH,1}$, $P_{O\_PSCCH,1}$, and $P_{O\_PSSCH,1}$ may be notified to the UE by the serving base station by using signaling, or may be predefined. For example, before S101, the configuration information sent by the serving base station includes values of $\alpha_{PSCCH,1}$, $\alpha_{PSSCH,1}$, $P_{O\_PSCCH,1}$, and $P_{O\_PSSCH,1}$.

Scenario 1: If a sum of the first power and the second power is equal to the first maximum transmit power, it is determined that the first transmit power is equal to the first power and that the second transmit power is equal to the second power.

In other words, if $\hat{P}_{PSCCH\_O}+\hat{P}_{PSSCH\_O}=\hat{P}_{CMAX,c}$, the foregoing open loop powers may be used as the first transmit power and the second transmit power. $\hat{P}_{PSCCH\_O}$ represents a linear value of the first power, $\hat{P}_{PSSCH\_O}$ represents a linear value of the second power, and $\hat{P}_{CMAX,c}$ represents a linear value of the first maximum transmit power.

Scenario 2: If a sum of the first power and the second power is greater than the first maximum transmit power, it is determined that the first transmit power is equal to the first power and that the second transmit power is equal to a difference between the first maximum transmit power and the first power. Alternatively, if a sum of the first power and the second power is greater than the first maximum transmit power, it is determined that the first transmit power is equal to a smaller one of the first power and the first maximum transmit power and that the second transmit power is equal to a difference between the first maximum transmit power and the first power.

In other words, $\hat{P}_{PSCCH\_O}+\hat{P}_{PSSCH\_O}>\hat{P}_{CMAX,c}$, it may be determined that a linear value of the first transmit power is equal to $\hat{P}_{PSCCH\_O}$ and that a linear value of the second transmit power is equal to $\hat{P}_{CMAX,c}-\hat{P}_{PSCCH\_O}$. Alternatively, if $\hat{P}_{PSCCH\_O}+\hat{P}_{PSSCH\_O}>\hat{P}_{CMAX,c}$, it may be determined that a linear value of the first transmit power is equal to $\min\{\hat{P}_{PSCCH\_O},\hat{P}_{CMAX,c}\}$ and that a linear value of the second transmit power is equal to $\hat{P}_{CMAX,c}-\min\{\hat{P}_{PSCCH\_O},\hat{P}_{CMAX,c}\}$.

Scenario 3: If a sum of the first power and the second power is less than the first maximum transmit power, it is determined that the first transmit power is equal to a sum of the first power and a first value and that the second transmit power is equal to a sum of the second power and a second value. A sum of the first transmit power and the second transmit power is equal to the first maximum transmit power, and the first value and the second value may meet a predefined relationship.

In other words, $\hat{P}_{PSCCH\_O}+\hat{P}_{PSSCH\_O}>\hat{P}_{CMAX,c}$, a remaining transmit power $\hat{P}_{CMAX,c}-\hat{P}_{PSCCH\_O}-\hat{P}_{PSSCH\_O}$ may be allocated to the control information and the data based on a specific value relationship. For example, a first value is allocated to the control information, a second value is allocated to the data, and a sum of the first value and the second value is equal to the remaining transmit power $\hat{P}_{CMAX,c}-\hat{P}_{PSCCH\_O}-\hat{P}_{PSSCH\_O}$.

The predefined relationship may be that a ratio of the first value to the second value is equal to a first preset value, a difference between the first value and the second value is equal to a second preset value, or a difference between a transmit power that is on each PRB and that is corresponding to the first value and a transmit power that is on each PRB and that is corresponding to the second value is equal to a third preset value.

Herein, the first preset value, the second preset value, or the third preset value may be predefined, for example, may be preconfigured in the UE; or may be agreed upon in advance in a communications protocol.

For example, assuming that the first maximum transmit power $P_{CMAX,c}$=23 dBm, that is, a linear value of the first maximum transmit power is $\hat{P}CMAX,c$=199.53 mW, and the first power and the second power calculated based on the foregoing formula are $\hat{P}_{PSCCH\_O}$=4 mW and $\hat{P}_{PSSCH\_O}$=16 mW, respectively, that is, $\hat{P}_{PSCCH\_O}+\hat{P}_{PSSCH\_O}<\hat{P}_{CMAX,c}$, it may be determined that a remaining transmit power is $\hat{P}_{CMAX,c}-\hat{P}_{PSCCH\_O}-\hat{P}_{PSSCH\_O}$=179.53 mW.

If the first preset value is equal to 1, it may be determined that the first value is equal to the second value, that is, is equal to 89.765 mW. Correspondingly, it may be determined that a linear value of the first transmit power is 93.765 mW and that a linear value of the second transmit power is 105.765 mW.

If the second preset value is equal to 20 mW, it may be determined that the first value is equal to 99.765 mW and that the second value is equal to 79.765 mW. Correspondingly, it may be determined that a linear value of the first transmit power is 103.765 mW and that a linear value of the second transmit power is 95.765 mW.

If the third preset value is equal to 10 mW, the control information occupies one PRB, and the data occupies 10 PRBs, it may be determined that the first value is equal to 25.41 mW and that the second value is equal to 154.12 mW. Correspondingly, it may be determined that a linear value of the first transmit power is 29.41 mW and that a linear value of the second transmit power is 170.12 mW.

It should be noted that, the second preset value and/or the third preset value may alternatively be logarithmic values. No example is given herein for description.

When the transmit power indication information in S101 includes both the first indication information of the first maximum transmit power of the UE and second indication information of a second maximum transmit power of the control information:

Optionally, in an embodiment, the second maximum transmit power may be used as the first transmit power, and it is determined that the second transmit power is a difference between the first maximum transmit power and the first transmit power.

To be specific, it is determined that a linear value of the first transmit power is $\hat{P}_{v1}$ and that a linear value of the second transmit power is $\hat{P}_{CMAX,c}-\hat{P}_{v1}$.

Optionally, in another embodiment, a first power of the control information is calculated based on transmission bandwidth of the first link and a path loss value of a second link, a smaller one of the first power and the second maximum transmit power is used as the first transmit power, and it is determined that the second transmit power is a difference between the first maximum transmit power and the first transmit power.

For a method for calculating the first power, refer to the calculation process in the foregoing embodiment. To avoid repetition, details are not described herein again.

To be specific, it is determined that the first transmit power is min $\{P_{PSCCH\_O},P_{v1}\}$, that is, a linear value of the first transmit power is min $\{\hat{P}_{PSCCH\_O},\hat{P}_{v1}\}$, and correspondingly, a linear value of the second transmit power is $\hat{P}_{CMAX,c}$−min $\{\hat{P}_{PSCCH\_O}, \hat{P}_{v1}\}$.

When the transmit power indication information in S101 includes the first indication information of the first maximum transmit power of the UE, second indication information of a second maximum transmit power of the control information, and third indication information of a third maximum transmit power of the data:

optionally, in an embodiment, a second power of the data may be calculated based on transmission bandwidth of the first link and a path loss value of a second link; the second maximum transmit power is used as the first transmit power, or a smaller one of a first power and the second maximum transmit power is used as the first transmit power, where the first power is of the control information and is calculated based on the transmission bandwidth of the first link and the path loss value of the second link; and a smallest one of the second power, the third maximum transmit power, and a difference between the first maximum transmit power and the first transmit power is used as the second transmit power.

It may be considered that in this embodiment, the control information has preference over the data. In other words, a priority of the control information is higher than that of the data.

For a method for calculating the first power and the second power, refer to the calculation process in the foregoing embodiment. To avoid repetition, details are not described herein again.

To be specific, it is determined that the first transmit power is $P_{v1}$ or min $\{P_{PSCCH\_O},P_{v1}\}$, that is, a linear value of the first transmit power is $\hat{P}_{v1}$ or min $\{\hat{P}_{PSCCH\_O},\hat{P}_{v1}\}$, and correspondingly, a linear value of the second transmit power is min $\{\hat{P}_{PSSCH\_O}, \hat{P}_{v2},\hat{P}_{CMAX,c}-\hat{P}_{v1}\}$ min $\{\hat{P}_{PSSCH\_O}, \hat{P}_{v2}, \hat{P}_{CMAX,c}$−min $\{\hat{P}_{PSCCH\_O},\hat{P}_{v1}\}\}$.

Optionally, in another embodiment, a first power of the control information may be calculated based on transmission bandwidth of the first link and a path loss value of a second link; the third maximum transmit power is used as the second transmit power, or a smaller one of a second power of the data and the third maximum transmit power is used as the second transmit power, where the second power is calculated based on the transmission bandwidth of the first link and the path loss value of the second link; and a smallest one of the first power, the second maximum transmit power, and a difference between the first maximum transmit power and the second transmit power is used as the first transmit power.

It may be considered that in this embodiment, the data has preference over the control information. In other words, a priority of the control information is lower than that of the data.

For a method for calculating the first power and the second power, refer to the calculation process in the foregoing embodiment. To avoid repetition, details are not described herein again.

To be specific, it is determined that the second transmit power is $P_{v2}$ or min $\{P_{PSSCH\_O},P_{v2}\}$, that is, a linear value of the second transmit power is $\hat{P}_{v2}$ or min $\{\hat{P}_{PSSCH\_O},\hat{P}_{v2}\}$, and correspondingly, a linear value of the first transmit power is min $\{\hat{P}_{PSCCH\_O}, \hat{P}_{v1},\hat{P}_{CMAX,c}-\hat{P}_{v2}\}$ or min $\{\hat{P}_{PSCCH\_O}, \hat{P}_{v1}, \hat{P}_{CMAX,c}$−min $\{\hat{P}_{PSSCH\_O}, \hat{P}_{v2}\}\}$.

When the control information and the data are in a same subframe, the first transmit power of the control information and the second transmit power of the data can be determined based on the foregoing embodiment of the present invention. This can resolve a prior-art problem that UE does not know how to properly determine transmit powers of control information and data.

S103. The UE sends the control information on the first link at the first transmit power, and sends the data on the first link at the second transmit power.

For example, in S103, the UE may send the control information and the data to one or more other UEs. In the scenario in FIG. 2 or FIG. 3, the one or more other UEs each may be the UE 30. In the scenario in FIG. 4, the one or more other UEs each may be the UE 1, the UE 2, or the UE 3.

In addition, in this embodiment of the present invention, the UE may transmit the control information and/or the data a plurality of times. That the control information and the data are in a same subframe may mean that in at least one of the plurality of transmissions, the control information and the data are in a same subframe.

Optionally, a quantity of transmissions of the control information may or may not be equal to a quantity of transmissions of the data.

If in a transmission of the plurality of transmissions, the control information and the data that are to be transmitted are in a same subframe, the first transmit power and the second transmit power are determined by using the method in S102, the control information is sent at the first transmit power, and the data is sent at the second transmit power.

If in a transmission of the plurality of transmissions, the control information and the data that are to be transmitted are in different subframes, the control information may be sent at a first power whose value is not greater than that of the first maximum transmit power, and the data is sent at a second power whose value is not greater than that of the first maximum transmit power. The value of the first power may or may not be equal to the value the second power.

In a transmission of the plurality transmissions, if transmission of the control information includes a first part transmission of the control information and a second part transmission of the control information, transmission of the data includes a first part transmission of the data and a second part transmission of the data, the first part transmission of the control information and the first part transmission of the data are performed in a same subframe, and the second part transmission of the to-be-transmitted control information and the second part transmission of the to-be-transmitted data are performed in different subframes, the first transmit power and the second transmit power are determined by using the method in S102, the first part transmission of the control information is sent at the first transmit power, and the first part transmission of the data is sent at the second transmit power; and the second part transmission of the control information may be sent at a third transmit power, and the second part transmission of the data may be sent at a fourth transmit power. Herein, the third transmit power is less than or equal to the first maximum transmit power, and the fourth transmit power is less than or equal to the first maximum transmit power. Herein, the first part transmission of the control information and the second part transmission of the control information mean a plurality of transmissions of one piece of control information. In the plurality of transmissions, content of control information is the same, but time-domain resources and frequency-domain resources used in the plurality of transmissions are different. Similarly, the first part transmission of the data and the second part transmission of the data herein mean a plurality of transmissions of one piece of data. In the plurality of transmissions, content of data is the same, but time-domain resources and frequency-domain resources used in the plurality of transmissions are different.

If a quantity of transmissions of the control information is not equal to a quantity of transmissions of the data, and only the control information is transmitted in a transmission, the control information may be sent at the first maximum transmit power. If only the data is transmitted in a transmission, the data may be sent at the first maximum transmit power.

Figures 8A, 8B, 8C:
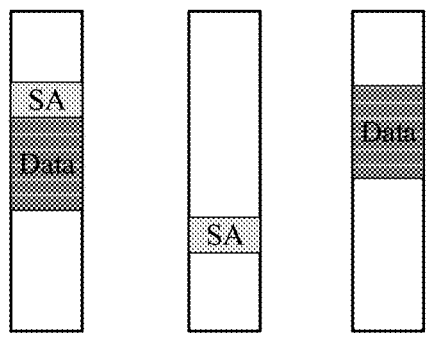
FIG. 8(a), FIG. 8(b), and FIG. 8(c) are schematic diagrams of scenarios in which SA and data are transmitted a plurality times in an embodiment of the present invention.

For example, assuming that the control information and the data are transmitted two times, the control information is transmitted in a subframe 1 and a subframe 3 in time domain in the two transmissions, and the data is transmitted in the subframe 1 and a subframe 5 in time domain in the two transmissions. In other words, the control information and the data are in a same subframe in a first transmission, and are in different subframes in a second transmission. As shown in FIG. 8, FIG. 8(*a*) indicates a first transmission, both the control information and the data are in a subframe 1, and in this case, transmit powers of the control information and the data are the first transmit power and the second transmit power, respectively. FIG. 8(*b*) and FIG. 8(*c*) indicate a second transmission, the control information is in a subframe 3, the data is in a subframe 5, and in this case, both transmit powers of the control information and the data may be equal to the first maximum transmit power, or transmit powers used in FIG. 8(*b*) and FIG. 8(*c*) may be independently configured in a prior-art manner.

In this way, when the control information and the data are in a same subframe, potential impact brought about by half duplexing can be reduced; when the control information and the data are in different subframes, different transmit powers can be configured, so that better coverage is provided. It can be learned that, both detectability of a received signal and a coverage area are considered in this embodiment.

Figure 9:
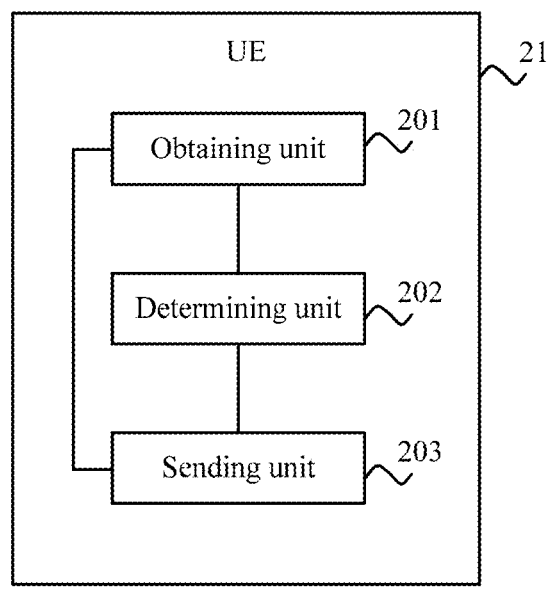
FIG. 9 is a structural block diagram of UE in an embodiment of the present invention.

FIG. 9 is a structural block diagram of UE in an embodiment of the present invention. UE 21 shown in FIG. 9 includes an obtaining unit 201, a determining unit 202, and a sending unit 203.

The obtaining unit 201 is configured to obtain transmit power indication information of a first link.

The determining unit 202 is configured to determine a first transmit power of control information and a second transmit power of data based on the transmit power indication information obtained by the obtaining unit 201.

The sending unit 203 is configured to: send the control information on the first link at the first transmit power determined by the determining unit 202, and send the data on the first link at the second transmit power determined by the determining unit 202, where the control information and the data are in a same subframe.

The transmit power indication information includes first indication information of a first maximum transmit power of the UE.

Optionally, the first indication information includes one piece of control information instructing to use maximum transmit powers for both the control information and the data, or the first indication information includes two independent pieces of control information respectively instructing to use maximum transmit powers for the control information and the data.

Optionally, the control information and the data are carried in a same physical channel, or the control information is carried in a control channel of the first link, and the data is carried in a data channel of the first link.

In an example, the determining unit 202 is specifically configured to determine the first transmit power and the second transmit power, so that a sum of a linear value of the first transmit power and a linear value of the second transmit power is equal to the first maximum transmit power, and a ratio of the first transmit power to the second transmit power is equal to a first preset value.

In another example, the determining unit 202 is specifically configured to determine the first transmit power and the second transmit power, so that a sum of a linear value of the first transmit power and a linear value of the second transmit power is equal to the first maximum transmit power, and a difference between the first transmit power and the second transmit power is equal to a second preset value.

In another example, the determining unit 202 is specifically configured to determine the first transmit power and the second transmit power, so that a sum of a linear value of the first transmit power and a linear value of the second transmit power is equal to the first maximum transmit power, and a difference between a transmit power on each physical resource block PRB of the control information and a transmit power on each PRB of the data is equal to a third preset value.

In another example, the determining unit 202 is specifically configured to: determine a first power of the control information and a second power of the data based on transmission bandwidth of the first link and a path loss value of a second link between the UE and a serving base station of the UE; and determine the first transmit power and the second transmit power based on the first power, the second power, and the first maximum transmit power.

Specifically, if a sum of a linear value of the first power and a linear value of the second power is equal to the first maximum transmit power, it is determined that the first transmit power is equal to the first power and that the second transmit power is equal to the second power.

If a sum of a linear value of the first power and a linear value of the second power is greater than the first maximum transmit power, it is determined that the first transmit power is equal to the first power or equal to a smaller one of the first power and the first maximum transmit power and that the second transmit power is equal to a difference between the linear value of the first maximum transmit power and a linear value of the first transmit power.

If a sum of a linear value of the first power and a linear value of the second power is less than the first maximum transmit power, it is determined that the first transmit power is equal to a sum of the first power and a first value and that the second transmit power is equal to a sum of the second power and a second value, where a sum of a linear value of the first transmit power and a linear value of the second transmit power is equal to the first maximum transmit power, and the first value and the second value meet a predefined relationship.

Optionally, in an embodiment, the transmit power indication information further includes second indication information of a second maximum transmit power of the control information.

In an example, the determining unit 202 is specifically configured to: use the second maximum transmit power as the first transmit power; and determine that the second transmit power is a difference between a linear value of the first maximum transmit power and a linear value of the first transmit power.

In another example, the determining unit 202 is specifically configured to: determine a first power of the control information based on transmission bandwidth of the first link and a path loss value of a second link between the UE and a serving base station of the UE; use a smaller one of the first power and the second maximum transmit power as the first transmit power; and determine that the second transmit power is a difference between a linear value of the first maximum transmit power and a linear value of the first transmit power.

Optionally, in an embodiment, the transmit power indication information further includes second indication information of a second maximum transmit power of the control information, and further includes third indication information of a third maximum transmit power of the data.

In an example, the determining unit 202 is specifically configured to: determine a second power of the data based on transmission bandwidth of the first link and a path loss value of a second link between the UE and a serving base station of the UE; use the second maximum transmit power as the first transmit power, or use a smaller one of a first power and the second maximum transmit power as the first transmit power, where the first power is of the control information and is determined based on the transmission bandwidth and the path loss value; and use a smallest one of the second power, the third maximum transmit power, and a difference between a linear value of the first maximum transmit power and a linear value of the first transmit power as the second transmit power.

In another example, the determining unit 202 is specifically configured to: determine a first power of the control information based on transmission bandwidth of the first link and a path loss value of a second link between the UE and a serving base station of the UE; use the third maximum transmit power as the second transmit power, or use a smaller one of a second power of the data and the third maximum transmit power as the second transmit power, where the second power is determined based on the transmission bandwidth and the path loss value; and use a smallest one of the first power, the second maximum transmit power, and a difference between a linear value of the first maximum transmit power and a linear value of the second transmit power as the first transmit power.

Figure 10:
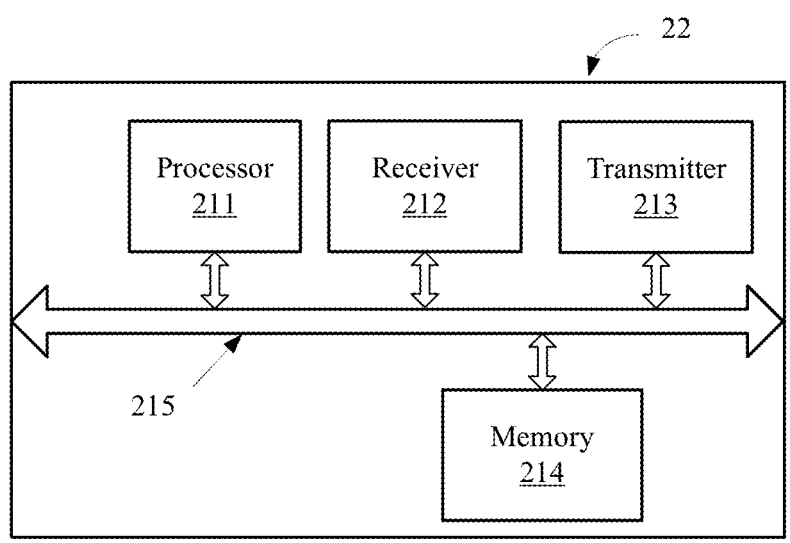
FIG. 10 is another structural block diagram of UE in an embodiment of the present invention.

It should be noted that, in this embodiment of the present invention, the obtaining unit 201 may be implemented by a receiver, the determining unit 202 may be implemented by a processor, and the sending unit 203 may be implemented by a transmitter. As shown in FIG. 10, UE 22 may include a processor 211, a receiver 212, a transmitter 213, and a memory 214. The memory 214 may be configured to store the first maximum transmit power, the second maximum transmit power, the third maximum transmit power, the first preset value, the second preset value, the third preset value, and the like, and may be further configured to store code executed by the processor 211, and the like.

Components of the UE 22 are coupled together by a bus system 215. In addition to a data bus, the bus system 215 includes a power bus, a control bus, and a status signal bus.

The UE 21 shown in FIG. 9 or the UE 22 shown in FIG. 10 can implement the processes implemented by the UE in the method embodiment in FIG. 6. To avoid repetition, details are not described herein again.

In terms used in the following embodiment, meanings of a first link, a second link, relay UE, and remote UE are the same as those described in the foregoing embodiment. A second maximum transmit power is marked as $P_{CMAX,c}$, $P_{CMAX}$, $P_{EMAX}$, or $P_{EMAX,c}$, and has any of the following meanings:

a maximum transmit power or an available maximum transmit power on a UE side;

a maximum transmit power or an available maximum transmit power on all carriers in a current subframe;

a maximum transmit power or an available maximum transmit power on a current carrier in a current subframe, or a maximum transmit power configured or predefined by a base station and indicated by maximum transmit power indication information.

It should be noted that, a value of the second maximum transmit power herein may be a logarithmic value (whose unit may be dBm) or a linear value (whose unit may be mW), that is, may be a value corresponding to a single frequency-domain transmission resource (such as one PRB) or may be a value corresponding to entire transmission bandwidth. Similarly, whether a power mentioned in subsequent embodiments of the present invention is of a logarithmic value or a linear value may be determined based on a unit of the power.

Figure 11:
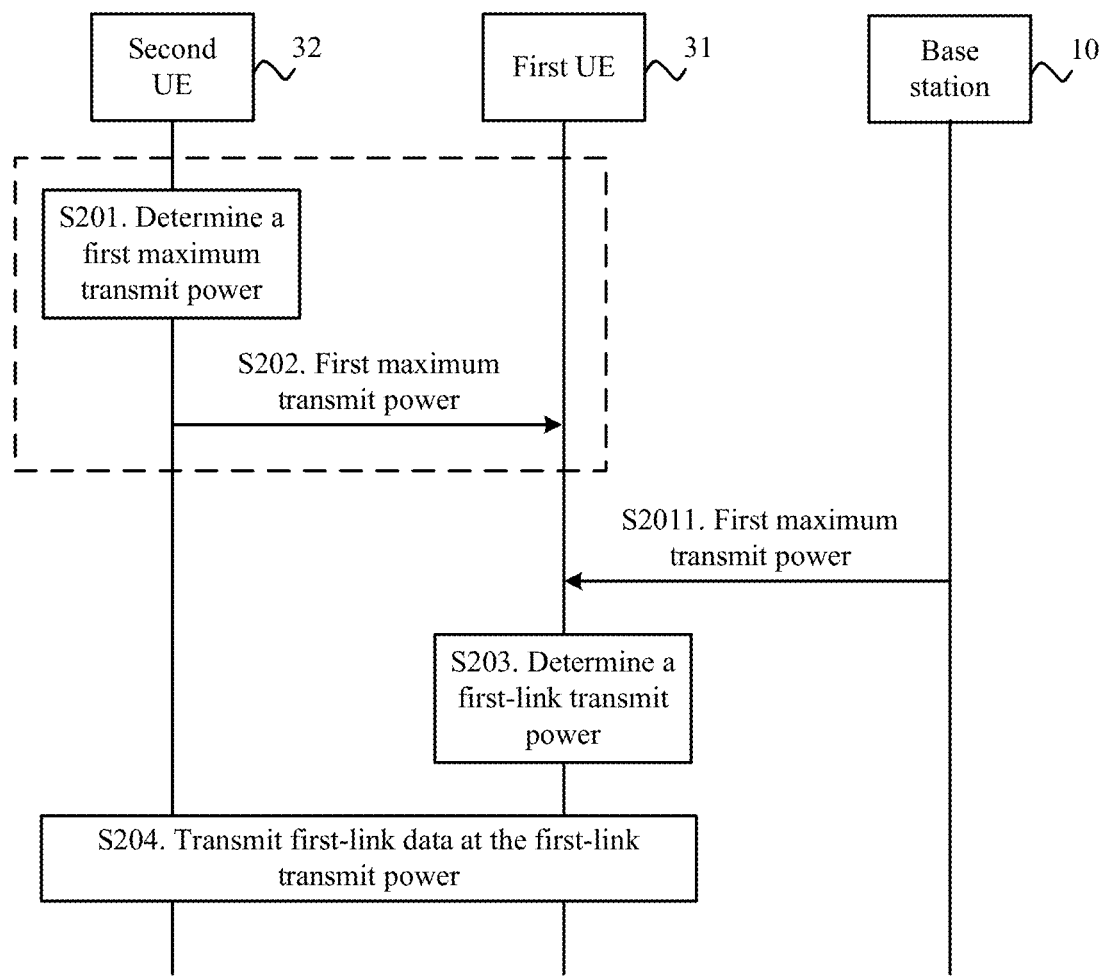
FIG. 11 is another flowchart of a transmit power determining method in an embodiment of the present invention.

FIG. 11 is a flowchart of a method for determining a first-link transmit power in an embodiment of the present invention. FIG. 11 shows first UE 31 and second UE 32. A first link is a link between the first UE 31 and the second UE 32. The first link herein may be a D2D link between two UEs, a sidelink in V2V communication, or the like.

The first UE 31 may be the UE 30 in FIG. 2 or FIG. 3, that is, remote UE. The second UE 32 may be the UE 20 in FIG. 2 or FIG. 3, that is, relay UE.

The method shown in FIG. 11 includes the following steps.

S201. The second UE 32 determines a first maximum transmit power on the first link.

Specifically, the second UE 32 may obtain configuration information from a serving base station of the second UE 32. The configuration information may include a maximum transmit power $P_{v,max}$ available to the second UE 32.

It is assumed that a link between the second UE 32 and the serving base station of the second UE 32 is a second link. Optionally, the second link may be a cellular link.

The second UE 31 may determine an open loop transmit power based on transmission bandwidth of the first link and a path loss value of the second link. For a method for calculating the open loop transmit power, refer to the prior art. For example, calculation is performed by using the following formula:

$$10 \log_{10}(M) + P_{O1} \alpha_1 \cdot PL,$$

where M represents the transmission bandwidth of a channel on the first link, PL represents the path loss value of the second link, $\alpha_1$ is a path loss compensation coefficient of the channel on the first link, and $P_{O1}$ is a power value configured or predefined by the serving base station. For example, the channel on the first link herein may be a PSSCH.

PL may be notified, after being determined by the serving base station, to the second UE 32 by the serving base station by using signaling, or may be determined by the second UE 32. For a method for calculating a path loss value, refer to the prior art. Details are not described herein.

$\alpha_1$ and $P_{O1}$ may be notified to the second UE 32 by the serving base station by using signaling. For example, before S201, the configuration information sent by the serving base station includes values of $\alpha_1$ and $P_{O1}$.

In S201, the second UE 32 may use a smaller one of the maximum transmit power $P_{v,max}$ and the open loop transmit power as the first maximum transmit power.

If the first maximum transmit power is marked as $P_{v1}$, in S201, it may be determined that the first maximum transmit power is $P_{v1} = \min\{P_{v,max}, 10 \log_{10}(M) + P_{O1} + \alpha_1 \cdot PL\}$.

S202. The second UE 32 sends a value of the first maximum transmit power.

The second UE 32 may send, in a unicast mode or a broadcast mode, the value of the first maximum transmit power to remote UE that establishes a first link with the second UE 32. For example, the second UE 32 sends the value of the first maximum transmit power to the first UE 31 in a unicast mode. For example, the second UE 32 sends, in a broadcast mode, the value of the first maximum transmit power to all remote UEs that communicate with the second UE 32, and the remote UEs include the first UE 31.

Optionally, in another embodiment, S201 and S202 in FIG. 11 may be replaced with S2011: A base station 10 sends indication information of the first maximum transmit power to the first UE 31.

The base station 10 may send the indication information of the first maximum transmit power on a second link in a unicast mode or a broadcast mode.

For example, the first UE 31 may receive first indication information sent by the base station 10. The first indication information is indication information used to indicate the first maximum transmit power on the second link between the second UE 32 and the base station 10.

Herein, the base station 10 may be the serving base station of the second UE 32. The first maximum transmit power may be configured by the base station 10 for the second UE 32.

In an example, if the first UE 31 cannot communicate with the base station 10, S2011 may be as follows: The base station 10 sends the indication information of the first maximum transmit power to the second UE 32, and the second UE 32 sends the indication information of the first maximum transmit power to the first UE 31 on the first link.

It should be noted that, sending performed in S2011 in FIG. 11 is not limited to direct sending and may alternatively be indirect sending.

In another example, in this embodiment, alternatively, after S201, the second UE 32 may first send the indication information of the first maximum transmit power to the base station 10, and then S2011 is performed.

S203. The first UE 31 determines a first-link transmit power based on the first maximum transmit power.

It is assumed that the first-link transmit power is marked as $P_{firstlink}$.

It is assumed that a maximum transmit power of the first UE 31 is a second maximum transmit power and is marked as $P_{v2}$.

Optionally, in an embodiment, the first UE 31 may use a smaller one of the first maximum transmit power and the second maximum transmit power as the first-link transmit power.

That is, $P_{firstlink} = \min\{P_{v1}, P_{v2}\}$.

Optionally, in another embodiment, the first UE 31 may determine a first power based on the transmission bandwidth of the first link and a path loss value of the first link, and use a smaller one of the first power and the first maximum transmit power as the first-link transmit power; or use a smallest one of the first power, the first maximum transmit power, and the second maximum transmit power as the first-link transmit power.

Correspondingly, it can be understood that, in this embodiment, before S203, the method further includes: obtaining, by the first UE 31, the path loss value of the first link. It should be noted that, this process may be performed before S202 or even before S201, or may be performed before or after S2011. This is not limited in the present invention.

A manner of obtaining the path loss value of the first link by the first UE 31 is not limited in this embodiment of the present invention. In an example, the manner may be: sending first transmit power indication information of the first UE 31 to the second UE 32; and receiving the path loss value of the first link sent by the second UE 32, where the path loss value of the first link is determined by the second UE 32 based on the first transmit power indication information. In other words, the second UE 32 may calculate the path loss value of the first link and then notify the first UE of the path loss value. In another example, the manner may be: receiving second transmit power indication information of the second UE 32 sent by the second UE 32; and determining the path loss value of the first link based on the second transmit power indication information. In other words, the path loss value of the first link may be calculated by the first UE 31. Specifically, for a method for calculating a path loss value, refer to the prior art. Details are not described herein.

Similarly, it may be determined that the first power is $10 \log_{10}(M)+P_{O2}+\alpha_2 \cdot PL_{firstlink}$, where M represents the transmission bandwidth of a channel on the first link, $PL_{firstlink}$ represents the path loss value of the first link, $\alpha_2$ is a path loss compensation coefficient of the channel on the first link, and $P_{O2}$ is a power value configured or predefined by the serving base station. For example, the channel on the first link herein may be a PSSCH.

$\alpha_2$ and $P_{O2}$ may be notified to the first UE 31 by the serving base station by using signaling. For example, before S201, the configuration information sent by the serving base station includes values of $\alpha_2$ and $P_{O2}$.

In this case, the first UE 31 may determine that the first-link transmit power is:

$$P_{firstlink}=\min\{P_{v1},10 \log_{10}(M)+P_{O2}+\alpha_2 \cdot PL_{firstlink}\}, \text{ or}$$

$$P_{firstlink}=\min\{P_{v1},P_{v2},10 \log_{10}(M)+P_{O2}+\alpha_2 \cdot PL_{firstlink}\}.$$

S204. The first UE 31 and the second UE 32 transmit first-link data.

Specifically, after S203, the first UE 31 may send the first link data such as D2D data or sidelink data to the second UE 32 at the first-link transmit power.

In this embodiment of the present invention, the determined first-link transmit power used for data transmission between the first UE and the second UE can be used for D2D communication or V2V communication between the two UEs. Therefore, efficiency of communication between the two UEs can be ensured.

Figure 12:
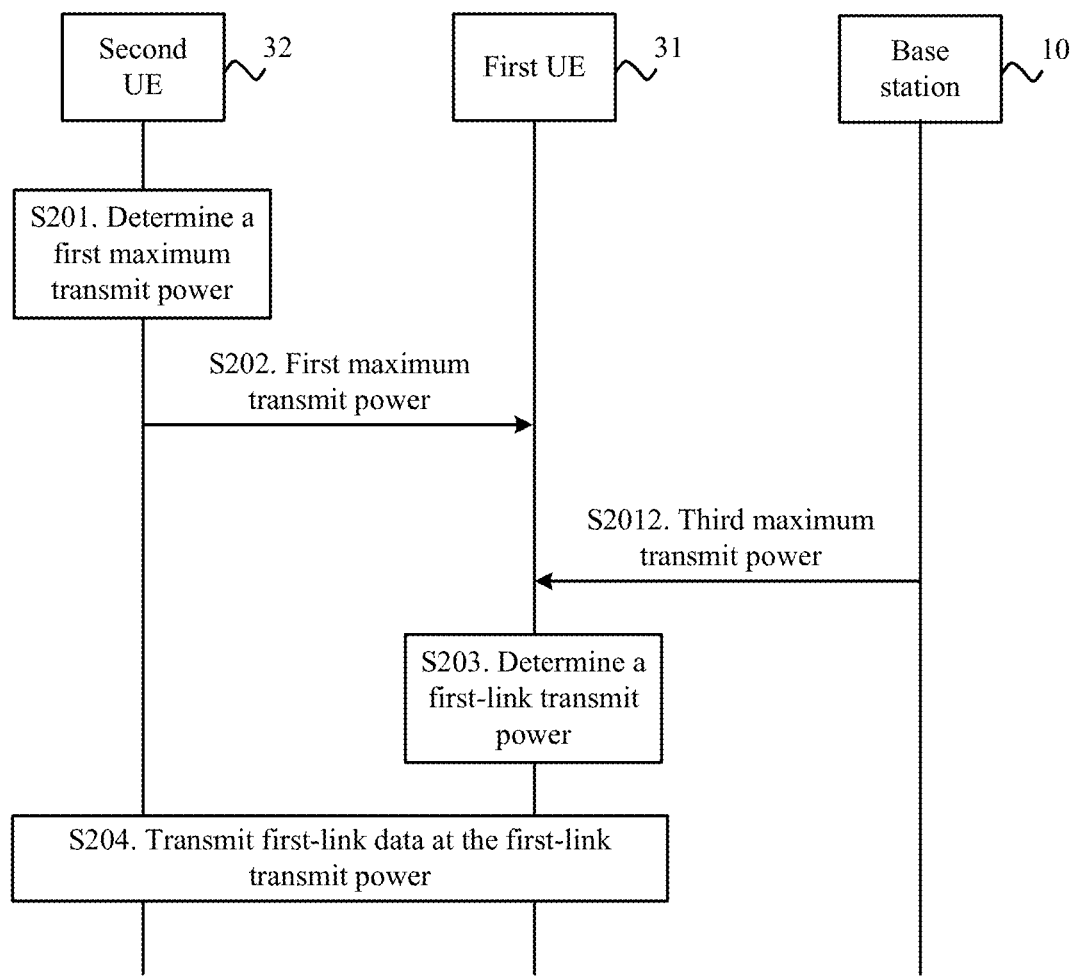
FIG. 12 is another flowchart of a transmit power determining method in an embodiment of the present invention.

In another embodiment, as shown in FIG. 12, before S203, the method may further include S2012. Details of S2012 are as follows:

S2012. The first UE 31 receives indication information, sent by the base station 10, of a third maximum transmit power.

Specifically, the first UE 31 may receive second indication information sent by the base station 10. The second indication information includes the indication information used to indicate the third maximum transmit power of the first UE.

Optionally, if the first UE 31 cannot directly communicate with the base station 10, the first UE 31 may receive the second indication information from the second UE 32. In other words, the base station 10 may send the second indication information on the second link between the base station 10 and the second UE 32 in a unicast mode or a broadcast mode, and then the second UE 32 sends the second indication information to the first UE 31 on the first link between the second UE 32 and the first UE 31 in the unicast mode or the broadcast mode.

It should be noted that, sending performed in S2012 in FIG. 12 is not limited to direct sending and may alternatively be indirect sending.

Herein, the third maximum transmit power may be a maximum transmit power that is available to the first UE 31 and that is configured by the base station 10 for the first UE 31. Optionally, the third maximum transmit power may be a maximum transmit power on each PRB.

Correspondingly, in S203 in FIG. 12, the first UE 31 may use a smallest one of a second maximum transmit power of the first UE, the first maximum transmit power, and the third maximum transmit power as the first-link transmit power; the first UE 31 may use a smaller one of a second maximum transmit power of the first UE and the third maximum transmit power as the first-link transmit power; or the first UE 31 may use a smaller one of the first maximum transmit power and the third maximum transmit power as the first-link transmit power.

It can be understood that, in the embodiment shown in FIG. 12, for description of S201 and S202, refer to the related description in FIG. 11. In addition, S201 and S202 may alternatively be replaced with S2011 for implementation, and the like. Details are not described herein again.

Figure 13:
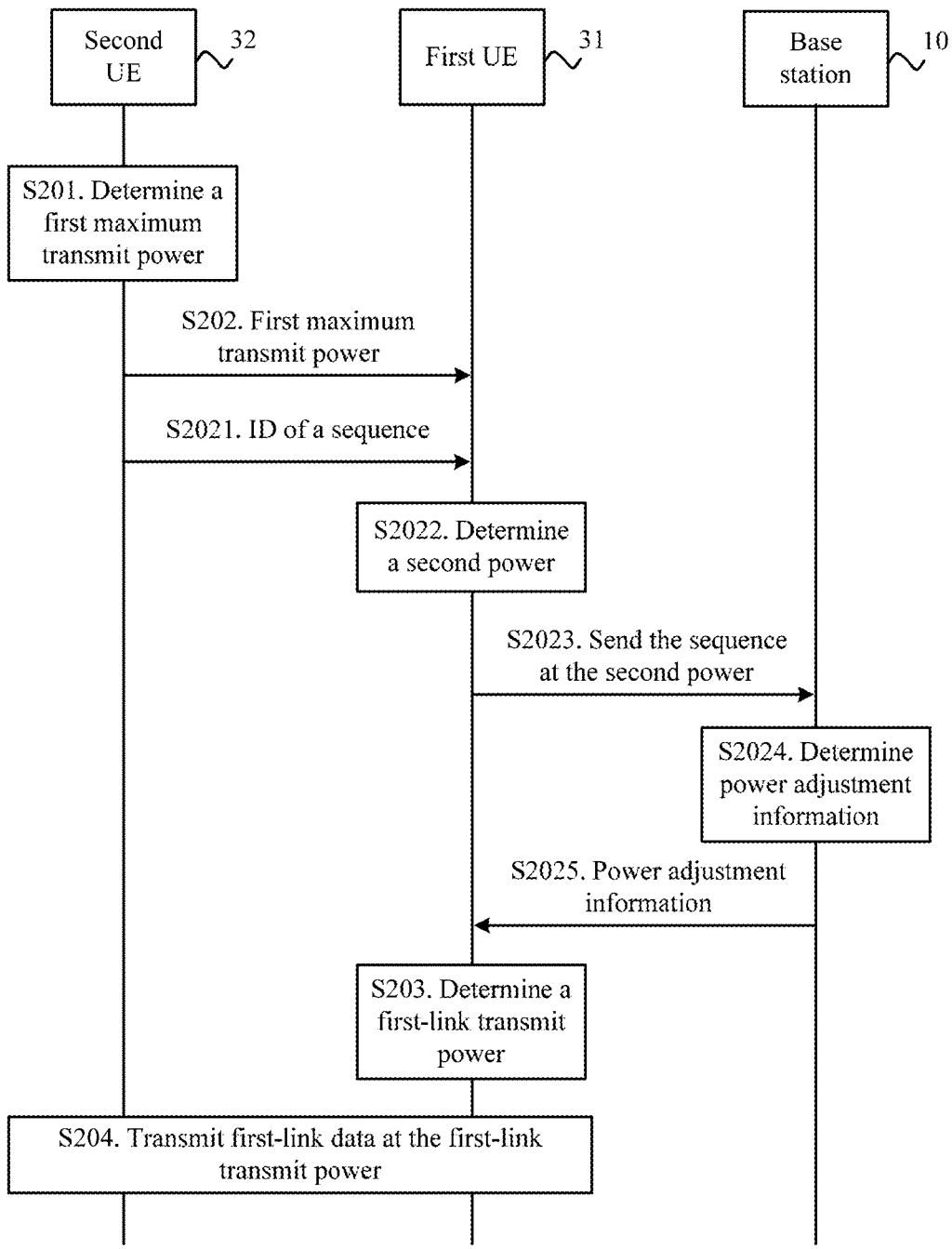
FIG. 13 is another flowchart of a transmit power determining method in an embodiment of the present invention.

In another embodiment, as shown in FIG. 13, before S203, the method further includes S2021 to S2025. Details of S2021 to S2025 are as follows.

S2021. The second UE 32 sends an identity (ID) of a sequence.

It should be noted that, S2021 may alternatively be performed before S202 or even before S201, or S2021 and S202 may be performed simultaneously. This is not limited in the present invention.

The second UE 32 may send information about the ID of the sequence on the first link in a unicast mode or a broadcast mode. Optionally, the sequence may be carried in a synchronization signal on the first link, such as a sidelink synchronization signal (SLSS).

The ID of the sequence may be determined by the second UE 32, or may be notified, after being determined by the base station 10, to the second UE 32 by the base station 10 by using signaling.

The ID of the sequence in S2021 may be a value associated with the second UE. In other words, different relay UEs may use different IDs of sequences.

The ID of the sequence received by the first UE 31 may be the same as or may be different from an ID of a sequence received by another UE that communicates with the second UE 32. In other words, all remote UEs that can communicate with the second UE 32 by using the first link may use a same sequence ID, or may use mutually different sequence IDs. This is not limited in the present invention.

S2022. The first UE 31 determines a second power.

Specifically, the first UE 31 may determine the second power based on the first maximum transmit power received in S202.

It can be understood that, S2021 may alternatively be performed after S2022. This is not limited in the present invention.

Herein, a smaller one of the first maximum transmit power and the second maximum transmit power may be used as the second power, that is, $\min\{P_{v1},P_{v2}\}$.

Optionally, the embodiment in FIG. 13 may be combined with the embodiment shown in FIG. 12 for implementation. In an example, S1012 may be performed before S2022. Correspondingly, in S2022, a smallest one of the first maximum transmit power, the second maximum transmit power, and the third maximum transmit power is used as the second power, or in S2022, a smaller one of the first maximum transmit power and the third maximum transmit power is used as the second power, or in S2022, a smaller one of the second maximum transmit power and the third maximum transmit power is used as the second power. Details are not described herein.

S2023. The first UE 31 sends the sequence at the second power.

Specifically, the first UE 31 sends, at the second power determined in S2022, the sequence received in S2021. Optionally, the sequence may be carried in a synchronization signal on the first link. For example, the synchronization signal on the first link may be an SLSS.

The first UE 31 may send the sequence by using a sidelink resource. The sidelink resource may be a part of resources used for a cellular link, or may be a dedicated sidelink resource.

Optionally, the first UE 31 may send the sequence on the first link. Alternatively, the first UE 31 may send the sequence on a second link between the first UE 31 and the base station 10.

S2024. The base station 10 determines power adjustment information.

Specifically, the base station 10 performs signal detection on a particular resource used by the sequence. During detection, the base station 10 determines a value relationship between a power of the received sequence and a power expected by the base station 10. The power of the sequence is greater than the expected power or the power of the sequence is less than the expected power.

If the power, detected by the base station 10, of the sequence is greater than the expected power, corresponding power adjustment information indicates that the power needs to be reduced.

For example, a frequency used for the sequence sent by the first UE 31 is an uplink spectrum used for a cellular link. In this case, if a transmit power of the first UE 31 is excessively high, reception by the base station on the uplink cellular link is interfered with. For example, the base station 10 determines that reception on the uplink cellular link is not interfered with if the detected power of the sequence is less than a particular threshold (which is the power expected by the base station 10), such as—100 dBm. If the detected power of the sequence is greater than the value, the base station may instruct to reduce a corresponding power for SLSS transmission corresponding to a corresponding SLSS ID.

It should be understood that, in a detection process, the base station 10 can detect sequences sent by a plurality of UEs. A plurality of remote UEs that communicate with one relay UE may send a same sequence or different sequences. The base station 10 may differentiate different relay UE groups by using IDs of sequences. For example, one relay UE and a plurality of remote UEs that communicate with the relay UE may be considered as one group of UEs, and use a first ID. Another relay UE and a plurality of remote UEs that communicate with the another relay UE may be considered as another group of UEs, and use a second ID.

For example, if the base station 10 detects three SLSSs: an SLSS1, an SLSS2, and an SLSS3 whose powers exceed a particular threshold power by 10 dB, 20 dB, and 3 dB, respectively, the base station 10 may indicate power adjustment values corresponding to the SLSS1, the SLSS2, the SLSS3 by using broadcast signaling or dedicated signaling. Correspondingly, the power adjustment information may include a correspondence between an ID of a sequence and a power adjustment value, as shown in Table 1 below:

TABLE 1

| | |
|---|---|
| ID of an SLSS1 | Power adjustment value 10 dB |
| ID of an SLSS2 | Power adjustment value 20 dB |
| ID of an SLSS3 | Power adjustment value 3 dB |

S2025. The base station 10 sends the power adjustment information.

Optionally, the base station 10 may send the power adjustment information by using broadcast signaling or dedicated signaling.

The base station 10 may send the power adjustment information to all UEs or some UEs in a coverage area of the base station 10. For example, the base station 10 may send the power adjustment information to relay UE. For example, the base station 10 may send the power adjustment information to relay UE and remote UE.

S203. The first UE 31 determines a first-link transmit power.

Specifically, the first UE 31 determines the first-link transmit power based on the power adjustment information and the second power.

It should be understood that, the power adjustment information may be directly received by the first UE 31 from the base station 10, or the power adjustment information may be sent by the second UE 32 to the first UE 31 after being sent by the base station 10 to relay UE (that is, the second UE 32).

In S203, the first UE 31 obtains, based on the ID of the sequence, a power adjustment value that is corresponding to the ID of the sequence and that is in the power adjustment information. Further, the first UE 31 may determine that the first-link transmit power is a difference between a linear value of the second power and a linear value of the power adjustment value, or may determine that the first-link transmit power is a difference between a logarithmic value of the second power and a logarithmic value of the power adjustment value.

It can be understood that, in the embodiment shown in FIG. 13, for description of S201 and S202, refer to the related description in FIG. 11. In addition, S201 and S202 may alternatively be replaced with S2011 for implementation, and the like. Details are not described herein again.

In this way, in this embodiment, the UE may determine the first-link transmit power based on the power adjustment information of the base station. This can prevent communication on a cellular link of the base station from being interfered with by transmission between UEs on the first link, and also can ensure efficiency of communication on the first link and communication on the second link.

Figure 14:
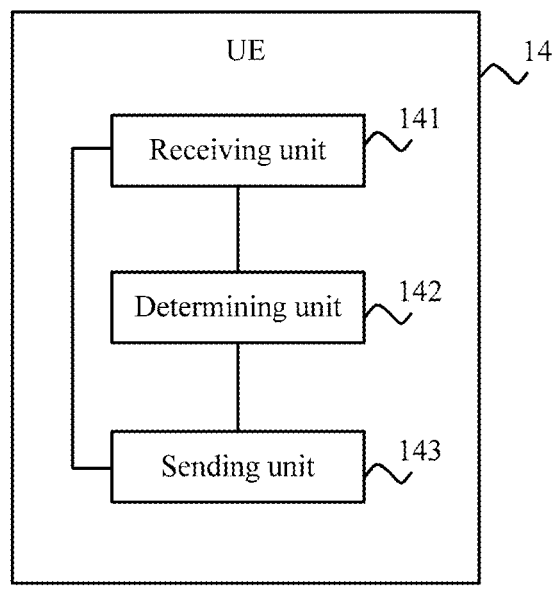
FIG. 14 is another structural block diagram of UE in an embodiment of the present invention.

FIG. 14 is another structural block diagram of UE in an embodiment of the present invention. UE 14 shown in FIG. 14 is first UE, including a receiving unit 141 and a determining unit 142.

The receiving unit 141 is configured to receive first indication information, where the first indication information includes indication information of a first maximum transmit power of second UE.

The determining unit 142 is configured to determine the first-link transmit power based on the first indication information received by the receiving unit 141, where the first link is a link between the first UE and the second UE.

The receiving unit 141 is specifically configured to receive the first indication information from the second UE or a base station. For example, the UE 14 may receive, on the first link, the first indication information sent by the second UE. Alternatively, the UE 14 may receive, on a second link, the first indication information sent by the base station. The second link is a link between the UE 14 and the base station.

In an example, the determining unit 142 is specifically configured to use a smaller one of a second maximum transmit power of the first UE and the first maximum transmit power as the first-link transmit power.

In another example, the determining unit 142 is specifically configured to: determine a first power based on transmission bandwidth of the first link and a path loss value of the first link; and use a smaller one of the first maximum transmit power and the first power as the first-link transmit power; or use a smallest one of a second maximum transmit power of the first UE, the first maximum transmit power, and the first power as the first-link transmit power.

Optionally, in an embodiment, the receiving unit 141 is further configured to receive indication information used to indicate an ID of a sequence used by the first UE, where the ID of the sequence used by the first UE has a same value as that of an ID of a sequence used by one or more other UEs that communicate with the second UE, or the ID of the sequence used by the first UE has a value different from that of an ID of a sequence used by one or more other UEs that communicate with the second UE, and the ID of the sequence used by the first UE is a value associated with the second UE.

In addition, the UE 14 may further include a sending unit 143. In an example, the determining unit 142 is further configured to use a smaller one of a maximum transmit power of the first UE and the first maximum transmit power as a first transmit power; the sending unit 143 is configured to send the sequence at the first transmit power; the receiving unit 141 is further configured to receive adjustment indication information sent by the base station, where the adjustment indication information is generated by the base station based on the sequence; and the determining unit 142 is further configured to adjust the first transmit power based on the adjustment indication information to determine the first-link transmit power.

The sending unit 143 is specifically configured to: send the sequence on a second link between the first UE and the base station; or send the sequence on the first link.

Optionally, in another embodiment, the receiving unit 141 is further configured to receive second indication information sent by the second UE or the base station, where the second indication information includes indication information of a third maximum transmit power of the first UE.

In an example, the determining unit 142 is specifically configured to use a smallest one of a second maximum transmit power of the first UE, the first maximum transmit power, and the third maximum transmit power as the first-link transmit power; or the determining unit 142 is specifically configured to use a smaller one of a second maximum transmit power of the first UE and the third maximum transmit power as the first-link transmit power; or the determining unit 142 is specifically configured to use a smaller one of the first maximum transmit power and the third maximum transmit power as the first-link transmit power.

The third maximum transmit power may be a maximum transmit power on each PRB.

Figure 15:
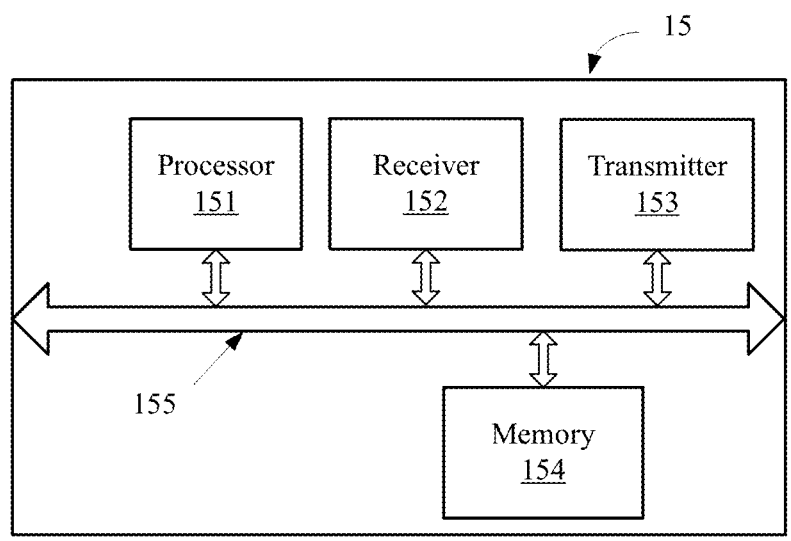
FIG. 15 is another structural block diagram of UE in an embodiment of the present invention.

It should be noted that, in this embodiment of the present invention, the receiving unit 141 may be implemented by a receiver, the determining unit 142 may be implemented by a processor, and the sending unit 143 may be implemented by a transmitter. As shown in FIG. 15, UE 15 may include a processor 151, a receiver 152, a transmitter 153, and a memory 154. The memory 154 may be configured to store the first maximum transmit power, the second maximum transmit power, the third maximum transmit power, and the like, and may be further configured to store code executed by the processor 151, and the like.

Components of the UE 15 are coupled together by a bus system 155. In addition to a data bus, the bus system 155 includes a power bus, a control bus, and a status signal bus.

The UE 14 shown in FIG. 14 or the UE 15 shown in FIG. 15 can implement the processes implemented by the first UE in the method embodiments in FIG. 11 to FIG. 13. To avoid repetition, details are not described herein again.

Figure 16:
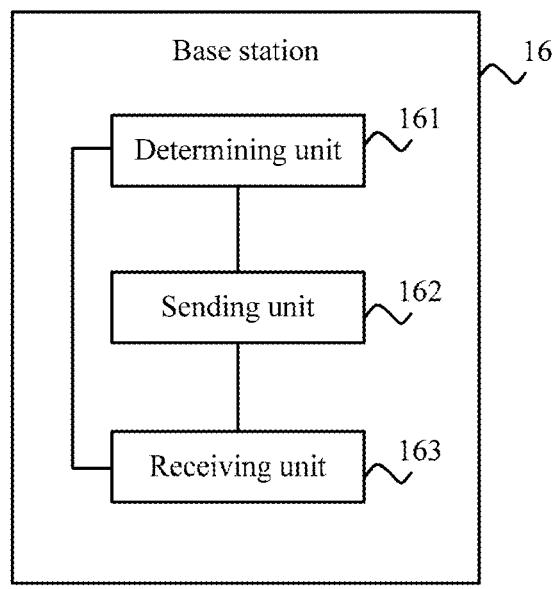
FIG. 16 is a structural block diagram of a base station in an embodiment of the present invention.

FIG. 16 is a structural block diagram of a base station in an embodiment of the present invention. A base station 16 shown in FIG. 16 includes a determining unit 161, a sending unit 162, and a receiving unit 163.

The determining unit 161 is configured to perform signal detection to determine a first power of a sequence received from at least one first user equipment UE. Correspondingly, the receiving unit 163 is configured to receive the sequence.

The determining unit 161 is further configured to determine, based on the first power, power adjustment information corresponding to the first UE.

The sending unit 162 is configured to send, to the first UE, the power adjustment information determined by the determining unit 161, so that the first UE determines a first-link transmit power, where the first link is a link between the first UE and second UE.

Figure 17:
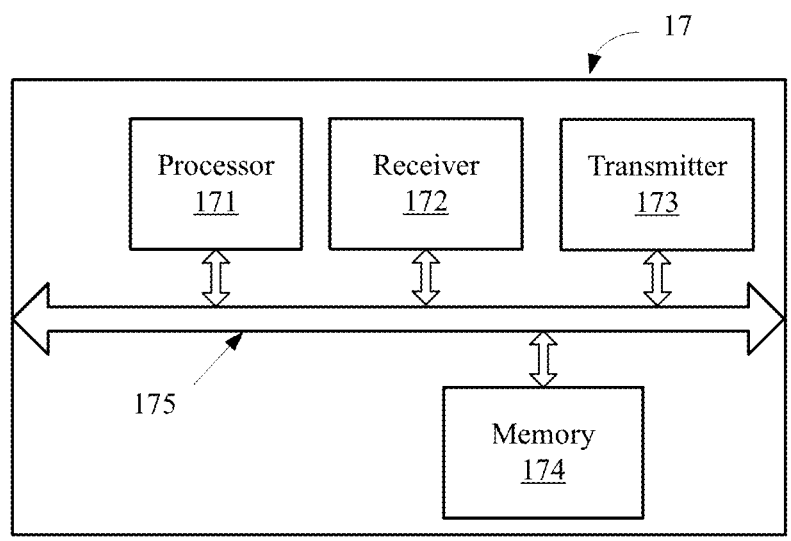
FIG. 17 is another structural block diagram of a base station in an embodiment of the present invention.

It should be noted that, in this embodiment of the present invention, the receiving unit 163 may be implemented by a receiver, the determining unit 161 may be implemented by a processor, and the sending unit 162 may be implemented by a transmitter. As shown in FIG. 17, a base station 17 may include a processor 171, a receiver 172, a transmitter 173, and a memory 174. The memory 174 may be configured to store a specific threshold, power adjustment information, and the like, and may be further configured to store code executed by the processor 171, and the like.

Components of the base station 17 are coupled together by a bus system 175. In addition to a data bus, the bus system 175 includes a power bus, a control bus, and a status signal bus.

The base station 16 shown in FIG. 16 or the base station 17 shown in FIG. 17 can implement the processes implemented by the base station in the method embodiments in FIG. 11 to FIG. 13. To avoid repetition, details are not described herein again.

It can be understood that, the processor in this embodiment of the present invention may be an integrated circuit chip and is capable of processing a signal. In an implementation process, the steps in the foregoing method embodiments can be implemented by using a hardware integrated logic circuit in the processor, or by using instructions in a form of software. The processor may be a general purpose processor, a digital signal processor (DSP), an application-specific integrated circuit (ASIC), a field programmable gate array (FPGA) or another programmable logic device, a discrete gate or transistor logic device, or a discrete hardware component. The processor may implement or perform the methods, the steps, and logical block diagrams that are disclosed in the embodiments of the present invention. The general purpose processor may be a microprocessor or the processor may be any conventional processor or the like. The steps of the methods disclosed with reference to the embodiments of the present invention may be directly implemented by using a hardware decoding processor, or may be implemented by using a combination of hardware and software modules in a decoding processor. The software module may be located in a mature storage medium in the art, such as a random access memory, a flash memory, a read-only memory, a programmable read-only memory, an electrically erasable programmable memory, or a register.

The storage medium is located in the memory, and the processor reads information in the memory and implements the steps in the foregoing methods in combination with hardware of the processor.

It may be understood that the memory in the embodiments of the present invention may be a volatile memory or a nonvolatile memory, or may include both a volatile memory and a nonvolatile memory. The nonvolatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (RAM), used as an external cache. Through example but not limitative description, many forms of RAMs may be used, such as a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct Rambus dynamic random access memory (DR RAM). It should be noted that the memory of the systems and methods described in this specification includes but is not limited to these memories and any memory of another proper type.

A person of ordinary skill in the art may be aware that, the units and algorithm steps in the examples described with reference to the embodiments disclosed in this specification may be implemented by electronic hardware or a combination of computer software and electronic hardware. Whether the functions are implemented by hardware or software depends on particular applications and design constraint conditions of the technical solutions. A person skilled in the art may use a different method to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate. Parts displayed as units may or may not be physical units, and may be located in one position or may be distributed on a plurality of network units. Some or all of the units may be selected based on actual requirements to achieve the objectives of the solutions of the embodiments.

In addition, functional units in the embodiments of the present invention may be integrated into one processing unit, or each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of the present invention. The foregoing storage medium includes any medium that can store program code, such as a USB flash drive, a removable hard disk, a read-only memory (ROM), a random access memory (RAM), a magnetic disk, or an optical disc.

The foregoing description is merely specific implementations of the present invention, but is not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A transmit power determining method, comprising:
   obtaining, by a user equipment (UE), transmit power indication information of a first link;
   determining, by the UE, a first transmit power of control information and a second transmit power of data based on the transmit power indication information; and
   sending, by the UE, the control information at the first transmit power, and the data at the second transmit power, wherein the control information and the data are sent on the first link in a same subframe, and wherein the first link is a sidelink.

2. The method according to claim 1, wherein the transmit power indication information comprises first indication information of a first maximum transmit power of the UE.

3. The method according to claim 2, wherein the determining a first transmit power of control information and a second transmit power of data based on the transmit power indication information comprises:
   determining the first transmit power of the control information and the second transmit power of the data, wherein a sum of a linear value of the first transmit power and a linear value of the second transmit power is equal to the first maximum transmit power, and a difference between a transmit power on each physical resource block (PRB) of the control information and a transmit power on each PRB of the data is equal to a third preset value.

4. The method according to claim 2, wherein the determining a first transmit power of control information and a second transmit power of data based on the transmit power indication information comprises:
   determining a first power of the control information and a second power of the data based on transmission bandwidth of the first link and a path loss value of a second link between the UE and a serving base station of the UE; and determining the first transmit power and the second transmit power based on the first power, the second power, and the first maximum transmit power.

5. The method according to claim 4, wherein if a sum of a linear value of the first power and a linear value of the second power is less than the first maximum transmit power, determining the first transmit power and the second transmit power comprises:
determining that the first transmit power is equal to a sum of the first power and a first value and that the second transmit power is equal to a sum of the second power and a second value, wherein a sum of a linear value of the first transmit power and a linear value of the second transmit power is equal to the first maximum transmit power, and the first value and the second value meet a predefined relationship.

6. The method according to claim 5, wherein the predefined relationship includes at least one of a ratio of the first value to the second value is equal to a first preset value, a difference between the first value and the second value is equal to a second preset value, or a difference between a transmit power that is on each physical resource block (PRB) corresponding to the first value and a transmit power that is on each PRB corresponding to the second value is equal to a third preset value.

7. The method according to claim 1, wherein the control information and the data are carried in a same physical channel, or the control information is carried in a control channel of the first link and the data is carried in a data channel of the first link.

8. A user equipment (UE), comprising:
at least one processor; and
a non-transitory computer-readable storage medium coupled to the at least one processor and storing programming instructions for execution by the at least one processor, the programming instructions instruct the at least one processor to perform one or more operations comprising:
obtaining transmit power indication information of a first link;
determining a first transmit power of control information and a second transmit power of data based on the transmit power indication information; and
sending the control information at the first transmit power, and the data at the second transmit power, wherein the control information and the data are sent on the first link in a same subframe, and wherein the first link is sidelink.

9. The user equipment according to claim 8, wherein the transmit power indication information comprises first indication information of a first maximum transmit power of the UE.

10. The user equipment according to claim 9, wherein the determining a first transmit power of control information and a second transmit power of data based on the transmit power indication information comprises:
determining the first transmit power of the control information and the second transmit power of the data, wherein a sum of a linear value of the first transmit power and a linear value of the second transmit power is equal to the first maximum transmit power, and a difference between a transmit power on each physical resource block (PRB) of the control information and a transmit power on each PRB of the data is equal to a third preset value.

11. The user equipment according to claim 9, wherein the determining a first transmit power of control information and a second transmit power of data based on the transmit power indication information comprises:
determining a first power of the control information and a second power of the data based on transmission bandwidth of the first link and a path loss value of a second link between the UE and a serving base station of the UE; and
determining the first transmit power and the second transmit power based on the first power, the second power, and the first maximum transmit power.

12. The user equipment according to claim 11, wherein if a sum of a linear value of the first power and a linear value of the second power is less than the first maximum transmit power, determining the first transmit power and the second transmit power comprises:
determining that the first transmit power is equal to a sum of the first power and a first value, and that the second transmit power is equal to a sum of the second power and a second value, wherein a sum of a linear value of the first transmit power and a linear value of the second transmit power is equal to the first maximum transmit power, and the first value and the second value meet a predefined relationship.

13. The user equipment according to claim 12, wherein the predefined relationship includes at least one of a ratio of the first value to the second value is equal to a first preset value, a difference between the first value and the second value is equal to a second preset value, or a difference between a transmit power that is on each physical resource block (PRB) corresponding to the first value and a transmit power that is on each (PRB) corresponding to the second value is equal to a third preset value.

14. The user equipment according to claim 8, wherein the control information and the data are carried in a same physical channel, or the control information is carried in a control channel of the first link and the data is carried in a data channel of the first link.

* * * * *

UNITED STATES PATENT AND TRADEMARK OFFICE
CERTIFICATE OF CORRECTION

PATENT NO. : 10,764,844 B2  
APPLICATION NO. : 16/051920  
DATED : September 1, 2020  
INVENTOR(S) : Chao Li and Xingwei Zhang Page 1 of 1

It is certified that error appears in the above-identified patent and that said Letters Patent is hereby corrected as shown below:

In the Specification

In Column 1, Line 9, delete "/CN 2016/" and insert -- /CN2016/ --, therefor.

Signed and Sealed this  
Twenty-ninth Day of December, 2020

Andrei Iancu  
*Director of the United States Patent and Trademark Office*